(12) United States Patent  (10) Patent No.: US 7,801,413 B2
Terakado et al.  (45) Date of Patent: Sep. 21, 2010

(54) INFORMATION PROCESSING DEVICE, METHOD, AND PROGRAM

(75) Inventors: Tomoko Terakado, Kanagawa (JP); Chieko Kusakabe, Chiba (JP); Kanako Nakamura, Tokyo (JP)

(73) Assignee: Sony Corporation (JP)

( * ) Notice: Subject to any disclaimer, the term of this patent is extended or adjusted under 35 U.S.C. 154(b) by 950 days.

(21) Appl. No.: 11/225,352

(22) Filed: Sep. 13, 2005

(65) Prior Publication Data
US 2006/0056806 A1  Mar. 16, 2006

(30) Foreign Application Priority Data
Sep. 14, 2004  (JP) ............................ P2004-267240

(51) Int. Cl.
H04N 7/00 (2006.01)
G11B 27/00 (2006.01)

(52) U.S. Cl. ............................ 386/95; 386/46; 386/55; 715/726

(58) Field of Classification Search .................... 386/52, 386/69, 95, 124–126, 117, 55; 345/231.4, 345/724, 727; 348/96, 738; 382/284; 715/719, 715/723, 726; 709/205; 358/909.1; 707/1–4, 707/7
See application file for complete search history.

(56) References Cited

U.S. PATENT DOCUMENTS

| 5,541,644 | A  | * | 7/1996  | Nanba .......................... 348/96 |
| 5,809,202 | A  | * | 9/1998  | Gotoh et al. .................. 386/69 |
| 6,067,126 | A  | * | 5/2000  | Alexander .................. 348/738 |
| 6,078,005 | A  | * | 6/2000  | Kurakake et al. .......... 84/477 R |
| 6,833,848 | B1 | * | 12/2004 | Wolff et al. ................. 715/719 |
| 6,952,716 | B1 | * | 10/2005 | Robb et al. ................. 709/205 |
| 7,239,348 | B2 | * | 7/2007  | Miyazaki ................. 348/231.4 |
| 7,248,778 | B1 | * | 7/2007  | Anderson et al. ............. 386/52 |
| 7,362,919 | B2 | * | 4/2008  | Das et al. ..................... 382/284 |
| 7,394,969 | B2 | * | 7/2008  | Sun et al. ...................... 386/69 |
| 2003/0160944 | A1 |   | 8/2003  | Foote et al. |
| 2004/0095379 | A1 | * | 5/2004  | Chang et al. ................. 345/727 |

(Continued)

FOREIGN PATENT DOCUMENTS

EP  1 422 668  5/2004

(Continued)

OTHER PUBLICATIONS

Extended European Search Report, EP 05 25 5567, Dated Sep. 6, 2006.

(Continued)

*Primary Examiner*—Thai Tran
*Assistant Examiner*—Mishawn Dunn
(74) *Attorney, Agent, or Firm*—Lerner, David, Littenberg, Krumholz & Mentlik, LLP

(57) ABSTRACT

An information processing device previously includes music options for use as a BGM, and these music options are each correlated to the details of an effect to represent the atmosphere matching the BGM. After a user selects a specific photo album storing still images for playback, and then a BGM, a playlist is created to define the order for playing back the still images stored in the photo album with the effect corresponding to the BGM. The present invention is applicable to equipment such as personal computers capable of handling still images, and therewith, effect-applied still images can be displayed easily and swiftly in a sequential manner.

19 Claims, 21 Drawing Sheets

U.S. PATENT DOCUMENTS

2004/0100487 A1* 5/2004 Mori et al. .................. 345/724
2006/0004698 A1* 1/2006 Pyhalammi et al. ............ 707/2

FOREIGN PATENT DOCUMENTS

| JP | 09-037170 A | 2/1997 |
| JP | 10-093905 A | 4/1998 |
| JP | 2001-339682 A | 12/2001 |
| JP | 2004-104675 A | 4/2004 |
| WO | WO-03/063132 | 7/2003 |
| WO | WO-03/073756 | 9/2003 |

OTHER PUBLICATIONS

"P506iC" Panasonic Website, Jun. 8, 2004, XP002370725.

* cited by examiner

USE PHOTOS IN ALBUM AS A BASIS TO MAKE NEW PLAYLIST OR CORRECT EXISTING PLAYLIST.

MAKE SELECTION USING ↕, AND DEPRESS → TO JUMP TO NEXT SCREEN.

CORRECT

USE PHOTOS IN ALBUM AS A BASIS TO MAKE NEW PLAYLIST OR CORRECT EXISTING PLAYLIST.

MAKE SELECTION USING ↕, AND DEPRESS → TO JUMP TO NEXT SCREEN.

NEWLY CREATE
CORRECT

NO ALBUM IS FOUND FOR PLAYLIST CREATION. END OF PLAYLIST CREATION/ CORRECTION.

ALBUM SELECTION

101

102 — ALBUM 2
2004/6/2 1:00:32AM

103

NO FILE IS FOUND FOR USE FOR PLAYLIST CREATION. MAKE ALBUM SELECTION AGAIN.

FIG. 18
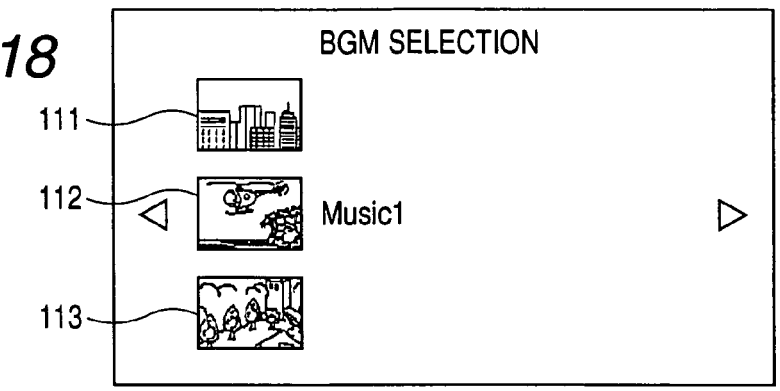
FIG. 19
PLAYLIST WILL BE CREATED WITH
THE FOLLOWING SELECTIONS.
ALBUM: TRIP MEMORIES
TRACK: Music1
PLAYBACK TIME: 2:00
FIG. 20
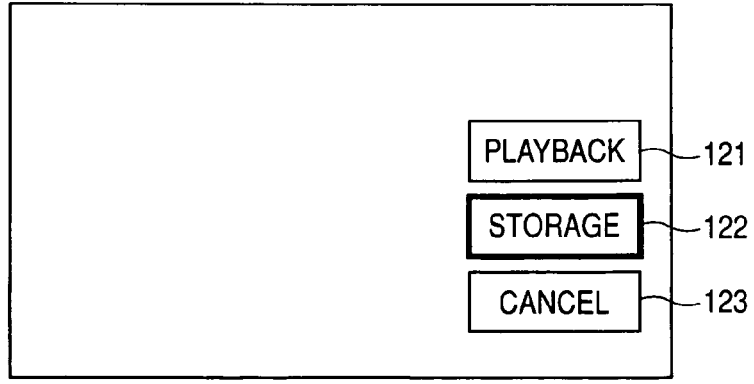

CANCEL PLAYLIST CREATION/CORRECTION.
DO YOU REALLY WANT TO?

YES  /  NO

INPUT TITLE IS ALREADY EXISTING OR UNAUTHORIZED.
TITLE CHANGE IS REQUESTED.

INPUT TITLE IS ALREADY EXISTING OR UNAUTHORIZED.
TITLE CHANGE IS REQUESTED.

THE FOLLOWING LETTERS AND SIGNS ARE NOT ALLOWED FOR USE.
/¥:*?"<>|'

HARD DISK SPACE IS NOT ENOUGH.
ERASE UNWANTED TITLES, TRACKS, AND PHOTOS.
END OF PLAYLIST CREATION/CORRECTION.

FIG. 27

PLAYLIST IS STORED.
NO VIDEO CREATION IS ALLOWED DURING RECORDING.
WAIT VIDEO CREATION FROM PLAYLIST UNTIL RECORDING IS COMPLETED.
END OF PLAYLIST CREATION/CORRECTION.

FIG. 28

DISK IS FULL OF TITLES.
ERASE UNWANTED TITLES, TRACKS, AND PHOTOS.
END OF PLAYLIST CREATION/CORRECTION.

FIG. 29

PLAYLIST IS STORED.
SELECT "VIDEO STORAGE" FOR CONTINUOUS VIDEO STORAGE.
DURING VIDEO CREATION, ONLY STOP BUTTON IS AVAILABLE FOR OPERATION, AND NO VIDEO PROGRAMMING IS ALLOWED.

TIME REQUIRED FOR CREATION: FIVE MINUTES
   PROGRAMMING TIME FOR VIDEO RECORDING
   : TEN DAYS 19:00
         STORE VIDEO     END

INFORMATION PROCESSING DEVICE, METHOD, AND PROGRAM

CROSS-REFERENCE TO RELATED APPLICATIONS

The present application claims priority from Japanese Patent Application No. JP 2004-267240 filed on Sep. 14, 2004, the disclosure of which is hereby incorporated by reference herein.

BACKGROUND OF THE INVENTION

The present invention relates to information processing devices, methods, and programs and, more specifically, to an information processing device, method, and program allowing to create easily and swiftly contents of effect-applied still images to be displayed in order with BGM (Back Ground Music).

Personal computers (PCs) and other various types of equipment are often provided with so-called a slide show feature. With the slide show feature, still images are automatically displayed in order at established time intervals, e.g., at every second. The PCs and equipment are those handling still images captured by digital cameras, and some give users the option of selecting BGMs for slide shows to suit their preferences.

Such a slide show feature eliminates the need for the users to manipulate the device for displaying the still images piece by piece, and automatically displays the still images sequentially with the users' favorite music.

As an alternative to such a slide show feature of displaying still images in equipment (captured still images) as they are, Non-patent Document 1 ("Docomo Mova P506iC Photococktail" the Internet URL: http://Panasonic.jp/mobile/p506ic/photo/index.html) describes a slide show feature of displaying still images applied with various types of effects in a sequential manner.

With such a slide show feature, the users make selections of target still images for playback, effect type, and a BGM to create a BGM-accompanying content. With the resulting content, the effect-applied still images are automatically displayed in a sequential manner. The problem with the slide show feature of Non-patent Document 1 is that the users are required to manipulate the device for three times to select target still images for playback, the effect type, and a BGM. The easier the device manipulation, the more preferable the feature is. This is because the slide show feature is needed, generally, due to the manipulation complexity for sequentially displaying still images, the users' wish to enjoy viewing still images, and others.

In view thereof, it is considered preferable if a BGM-accompanying content of still images applied with various types of effects is created with fewer manipulation processes for sequential display.

The issue here is that if the users are offered with the option of selecting an effect type and a BGM, the selection results may cause a mismatch between the atmosphere of the BGM and the atmosphere as a result of effects application. With this being the case, the resulting content of a slide show may cause the users to feel ill at ease.

SUMMARY OF THE INVENTION

It is thus considered desirable to enable to create easily and swiftly contents of effect-applied still images to be displayed in order with a BGM.

An embodiment of the present invention is directed to an information processing device that includes: a management section for managing a plurality of still images with a correlation between a BGM at playback time and details of an effect applied at playback time to each of the still images; and a playlist creation section for creating a playlist that defines a procedure of sequentially playing back the still images selected by a user with details of an effect correlated by the management section to a BGM selected by the user.

The playlist creation section may create a playlist that defines the procedure of playing back still images stored in a folder selected by the user.

The information processing device according to the embodiment of the present invention may be further provided with a playback section for playing back, with the BGM selected by the user, the still images in accordance with the procedure defined by the playlist created by the playlist creation section.

The information processing device according to the embodiment of the present invention may be also further provided with an extraction section for decimating the still images selected by the user to derive a group of still images for playback when a first playback time to be taken to play back all of the still images selected by the user is longer than a second playback time to be taken to play back the BGM selected by the user. If this is the configuration, the playback section plays back the group of still images derived by the extraction section.

The extraction section may derive the group of still images for playback in such a manner as to substantially equalize the first and second playback times.

The information processing device according to the embodiment of the present invention may be further provided with a dynamic content creation section for storing the playback result derived by the playback section as a dynamic content.

When a playback time to be taken to play back all of the still images selected by the user is longer than a playback time to be taken to play back the BGM selected by the user, the playback section may repeatedly play back the BGM until all of the still images selected by the user are played back in accordance with the procedure defined by the playlist.

The information processing device according to the embodiment of the present invention may be further provided with a menu display section for displaying a menu that includes a plurality of category icons each representing a category in a predetermined direction, and in a direction orthogonal to the predetermined direction, a plurality of content icons each corresponding to a content belonging to each of the categories.

The menu display section may display, in the menu, the playlist created by the playlist creation section as a content belonging to a still image category.

The information processing device according to the embodiment of the present invention may be further provided with a playback section for playing back the still images, with the BGM selected by the user, in accordance with the procedure defined by the playlist created by the playlist creation section, and a dynamic content creation section for storing the playback result derived by the playback section as a dynamic content. If this is the configuration, the menu display section displays, in the menu, the dynamic content created by the dynamic content creation section as a content belonging to a moving image category.

The information processing device according to the embodiment of the present invention may be further provided with an output control section for exercising control over the dynamic content created by the dynamic content creation section to be recorded on a recording medium or output to other equipment.

When the BGM selected by the user is correlated to the details of a plurality of effects, the playback section may sequentially play back the still images selected by the user with any one of the effects selected by the user among the effects correlated to the BGM selected by the user.

The details of the effect may be set to match with the atmosphere of the BGM in accordance with the tempo or the music genre of the BGM.

In the information processing device according to the embodiment of the present invention, the BGM may be previously stored.

In the information processing device according to the embodiment of the present invention, the BGM may be the one stored therein by the user.

In the information processing device according to the embodiment of the present invention, attribute information including the tempo and music genre of the BGM stored therein by the user is acquired from a music CD (Compact Disk) or a predetermined server over a network, and the attribute information is used as a basis to establish a correlation between an effect and a BGM.

Another embodiment of the present invention is directed to an information processing method for managing a plurality of still images with a correlation between a BGM (Back Ground Music) at playback time and details of an effect applied at playback time to each of the still images. The method includes creating a playlist that defines a procedure of sequentially playing back the still images selected by a user with details of an effect correlated to a BGM selected by the user.

Still another embodiment of the present invention is directed to a recording medium recorded with a program operable to instruct a computer to execute an information processing method for managing a plurality of still images with a correlation between a BGM (Back Ground Music) at playback time and details of an effect applied at playback time to each of the still images. The method includes creating a playlist that defines a procedure of sequentially playing back the still images selected by a user with details of an effect correlated to a BGM selected by the user.

With the information processing device, method, and program according to the embodiments of the present invention, a plurality of still images are managed with a correlation between a BGM at playback time and details of an effect applied at playback time to each of the still images. Created thereby is a playlist that defines a procedure of sequentially playing back the still images selected by a user with details of an effect correlated by the management section to a BGM selected by the user.

According to the present invention, contents of effect-applied still images to be displayed in order with a BGM can be created easily and swiftly.

BRIEF DESCRIPTION OF THE DRAWINGS

FIG. 18 is a diagram showing an exemplary screen to be displayed in step S12 of FIG. 9;

FIG. 19 is a diagram showing an exemplary screen to be displayed in step S13 of FIG. 9;

FIG. 20 is a diagram showing an exemplary screen to be displayed in step S15 of FIG. 10;

FIG. 27 is a diagram showing an exemplary screen to be displayed in step S31 of FIG. 11;

FIG. 28 is a diagram showing an exemplary screen to be displayed in step S34 of FIG. 11;

FIG. 29 is a diagram showing an exemplary screen to be displayed in step S35 of FIG. 11;

DETAILED DESCRIPTION

Prior to describing embodiments of the present invention, exemplified below is a correlation among claimed details and embodiments. This is aimed to prove that embodiments provided for the purpose of supporting the description of claims are described in this specification. Therefore, even if there are any embodiments found here but not described as correlated to the present invention, it does not mean that the embodiments are not correlated to the present invention. On the other hand, even if there are embodiments found here as correlated to the present invention, it does not mean that the embodiments are not correlated to other inventions not including the present invention.

Moreover, the description herein does not mean that aspects of the present invention are completely claimed. In other words, this description is not denying the presence of aspects not claimed but corresponding to the embodiments of the present invention, i.e., the presence of inventions for future divisional application or amendment addition.

Figure 5:
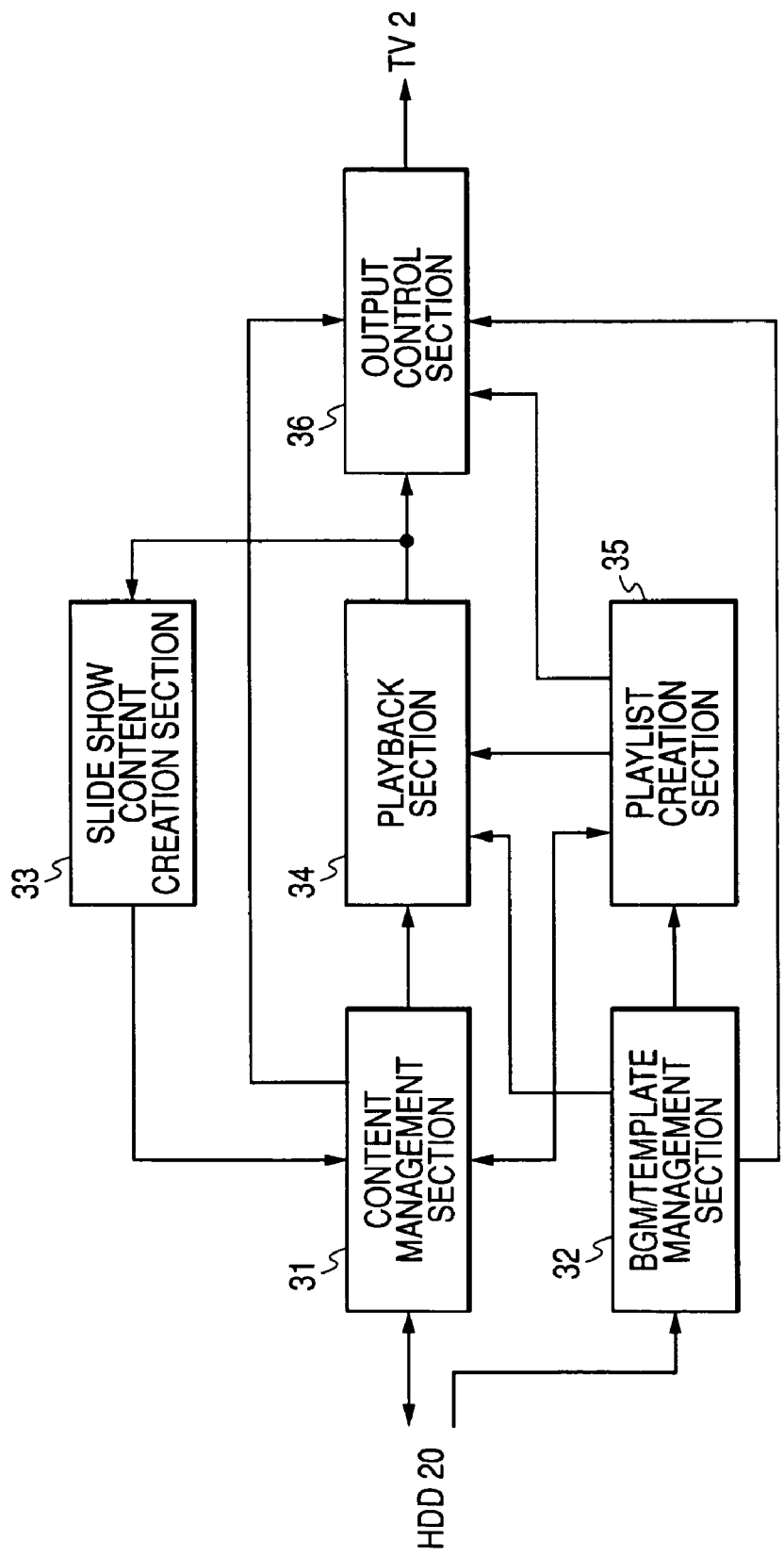
FIG. 5 is a block diagram showing an exemplary function configuration of the information processing device.

An information processing device according to an embodiment of the present invention is provided with a management section, e.g., a BGM/template management section 32 of FIG. 5, and a playlist creation section, e.g., a playlist creation section 35 of FIG. 5. The management section takes charge of managing a plurality of still images with a correlation between a BGM at playback time and details of an effect applied at playback time to each of the still images. If this is the configuration, the playlist creation section creates a playlist that defines a procedure of sequentially playing back the still images selected by a user with details of an effect correlated by the management section to a BGM selected by the user.

An information processing device according to another embodiment of the present invention is also provided with a playback section, e.g., a playback section 34 of FIG. 5, for playing back, with the BGM selected by the user, the still images in accordance with the procedure defined by the playlist created by the playlist creation section.

Figure 6:
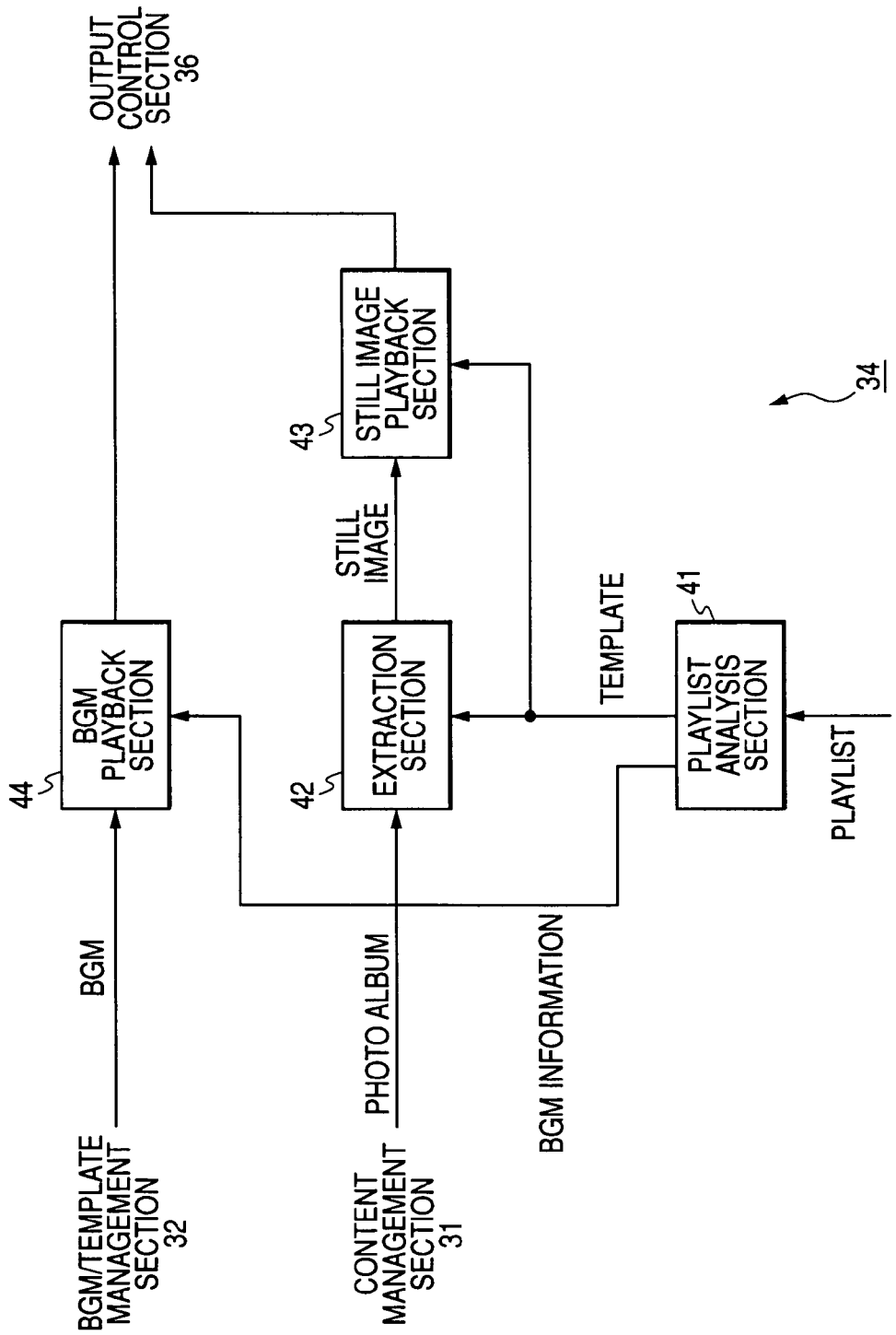
FIG. 6 is a block diagram showing an exemplary configuration of a playback section of FIG. 5.

An information processing device according to still another embodiment of the present invention is also provided with an extraction section, e.g., an extraction section 42 of FIG. 6, for decimating the still images selected by the user to derive a group of still images for playback when a first playback time to be taken to play back all of the still images selected by the user is longer than a second playback time to be taken to play back the BGM selected by the user. The playback section plays back the group of still images derived by the extraction section.

An information processing device according to still another embodiment of the present invention is also provided with a dynamic content creation section, i.e., a slide show content creation section 33, for storing the playback result derived by the playback section as a dynamic content.

Figure 7:
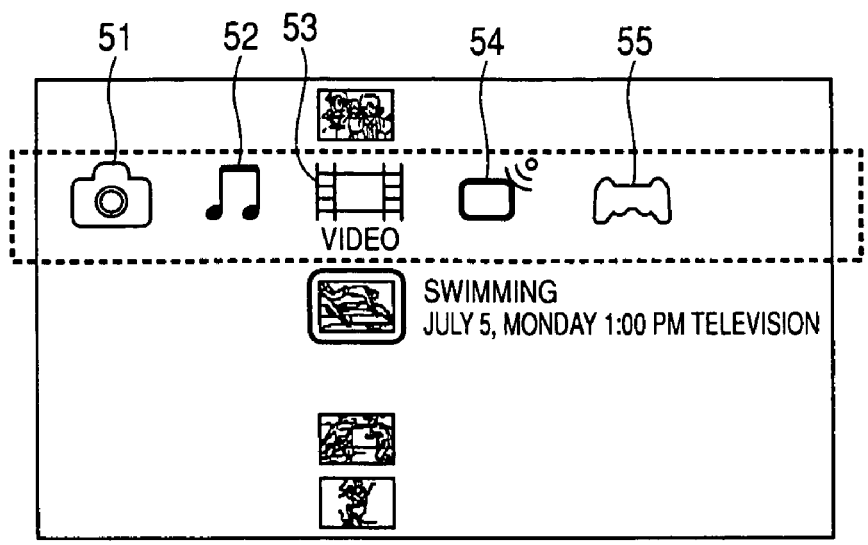
FIG. 7 is a diagram showing an exemplary menu screen.

An information processing device according to still another embodiment of the present invention is also provided with a menu display section, e.g., an output control section 36 for displaying the screen of FIG. 7, for displaying a menu that includes a plurality of category icons each representing a category in a predetermined direction, and in a direction orthogonal to the predetermined direction, a plurality of content icons each corresponding to a content belonging to each of the categories.

An information processing device according to still another embodiment of the present invention is further provided with a playback section, e.g., a playback section 34 of FIG. 5, and a dynamic content creation section, e.g., a slide show content creation section 33 of FIG. 5. The playback section plays back the still images, with the BGM selected by the user, in accordance with the procedure defined by the playlist created by the playlist creation section. The dynamic content creation section stores the playback result derived by the playback section as a dynamic content. If this is the configuration, the menu display section displays, in the menu, the dynamic content created by the dynamic content creation section as a content belonging to a moving image category.

An information processing method according to an embodiment of the present invention is used in an information processing device for managing a plurality of still images with a correlation between a BGM at playback time and details of an effect applied at playback time to each of the still images. The method includes a playlist creation step, e.g., step S14 of FIG. 9, of creating a playlist that defines a procedure of sequentially playing back the still images selected by a user with details of an effect correlated to a BGM selected by the user.

A program according to an embodiment of the present invention shares the same steps as in the above-described information processing method of an exemplary embodiment.

In the below, embodiments of the present invention are described by referring to the accompanying drawings.

Figure 1:
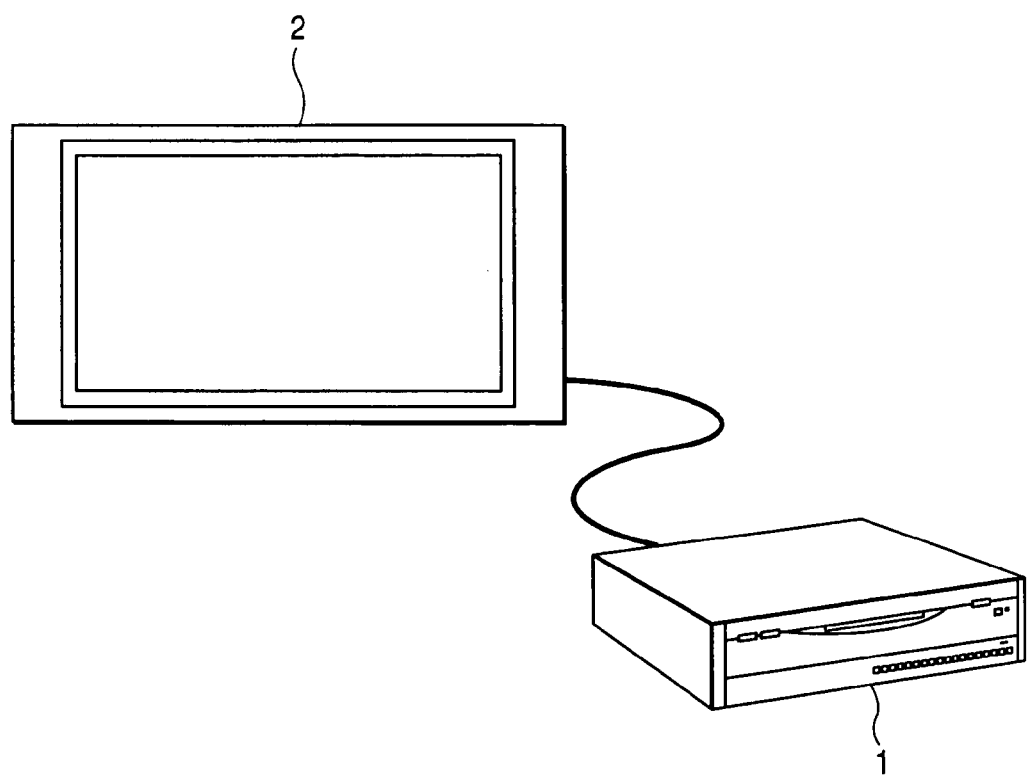
FIG. 1 is a diagram showing an exemplary outer view of an information processing device applied with the present invention, and that of a television receiver.

FIG. 1 is a diagram showing an exemplary outer view of an information processing device 1 applied with the present invention, and an exemplary outer view of a television receiver 2 (hereinafter, referred to as TV 2) that is connected to the information processing device 1 through a cable.

The information processing device 1 serves to display still images stored in an internal HDD (Hard Disk Drive) onto the TV 2. The still images are those captured by digital cameras or others, and stored in the HDD through a memory card, a USB (Universal Serial Bus) cable, or others. The information processing device 1 runs a slide show, i.e., sequentially displays still images applied with various types of effects with a BGM selected by a user. Such a slide show is run automatically, not depending on the user's device manipulation.

The user makes various selections based on a wizard appearing on the TV 2 so that a content of still images applied with various types of effects is created. The still images are to be automatically displayed in a sequential manner with the selected BGM, and hereinafter, the resulting content is referred to as slide show content as appropriate.

To create a slide show content, mainly, the user manipulates the device for twice to make selections of a photo album storing any target still images for a slide show, i.e., a folder storing a still image file, and a BGM. The resulting slide show content is actually a "playlist" as will be described later.

More in detail, the information processing device 1 previously carries a predetermined number of music tunes in its HDD for use as a BGM. The music tunes are each correlated to an effect of a matching atmosphere. The effect details are prepared to match the atmosphere of the music tune in consideration of the music tempo, music genre, or others.

As such, when the user wants to create a slide show content, selecting only his or her preferred music tune for use as a BGM can derive the effect matching in atmosphere to the tune.

What is more, the user is no more required to select still images piece by piece for playback. Instead, the user only needs to select a photo album, and accordingly, still images stored in the photo album are entirely selected as a group of still images for playback. Assuming if the user-selected photo album carries a lot of still images, and if the time for playing back the images takes longer than the time for playing back once a BGM, the information processing device 1 automatically adjusts the number of still images for playback, i.e., decimates the still images in the photo album so as to substantially equalize the playback time between the still images and the BGM. This will be described later in more detail.

Such a feature allows the user to simply select a photo album including still images he or she wants to play back without worrying about the number of still images in a photo album or the playback time of a BGM.

Figure 2:
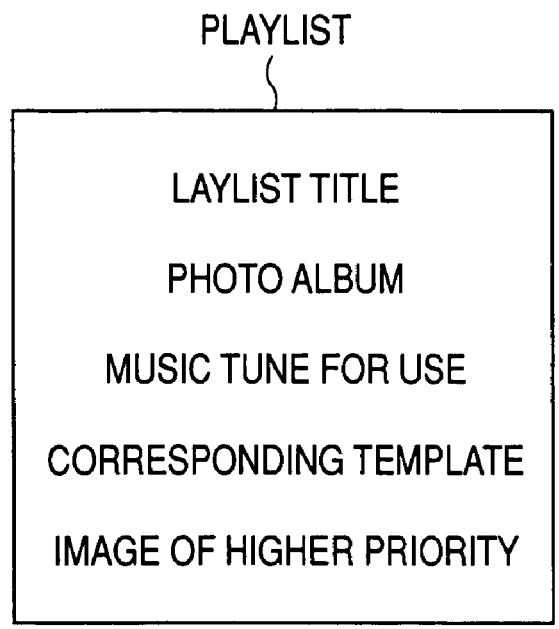
FIG. 2 is a diagram showing an exemplary playlist.

In accordance with such user's selections, i.e., selections of photo album and BGM, the information processing device 1 creates such a playlist as shown in FIG. 2.

When the user selects a specific playlist, any corresponding photo album and BGM are responsively read out, and still images stored in the photo album are played back following a procedure defined by the playlist for playback. At playback, the read BGM is also played back. As such, the playlist is information for use to define the procedure of playing back still images, and to create a slide show content.

Described now is the description details of a playlist.

By referring to FIG. 2, a playlist includes "playlist title", "photo album", "music tune for use", "corresponding template", and "image of higher priority".

The "playlist title" denotes the title of the playlist, and is set by the user as appropriate.

The "photo album" is information for use to designate a photo album storing any target still images for playback. When the user selects a specific playlist, a photo album designated by the "photo album" in the selected playlist is responsively read from the HDD, and still images stored therein are then played back (displayed).

The "music tune for use" is information for use to designate a BGM. When the user selects a specific playlist, a music tune designated by the "music tune for use" in the selected playlist is read from the HDD for playback as a BGM.

Figure 3:
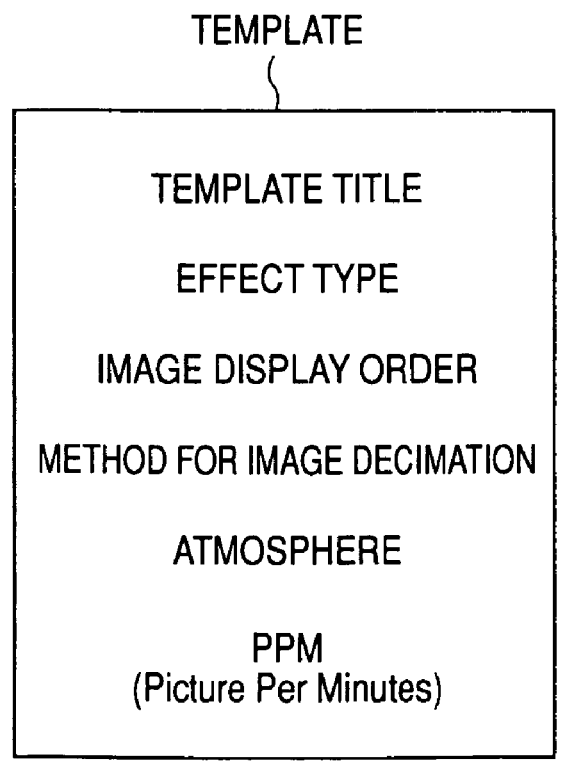
FIG. 3 is a diagram showing an exemplary template.

The "corresponding template" is information correlated to the BGM designated by the "music tune for use", and used to designate a template including the effect details or others, e.g., the "template title" of FIG. 3. When the user selects a specific playlist, a template designated by the "corresponding template" in the selected playlist is read from the HDD, and the target still images for playback are applied with the effect as described in the template. The template will be described later by referring to FIG. 3.

The "image of higher priority" is information for use to designate which still image(s) in the photo album designated by the "photo album" are assigned with a higher priority for display. As described above, when the user-selected photo album carries a lot of still images, image decimation is sometimes performed based on the playback time of the BGM. However, the still image(s) designated by the "image of higher priority" are not subjected to such image decimation, and are selected as having a higher priority over others. Such designation of "image of higher priority" may be automatically performed by the information processing device 1, or may be designated by the user.

FIG. 3 is a diagram showing an exemplary template.

By referring to FIG. 3, a template includes "template title", "effect type", "image display order", "method for image decimation", "atmosphere", and "PPM "(Picture Per Minutes), for example.

The "template title" denotes the title of the template.

The "effect type" is information for use to designate the type (details) of an effect for application to target still images for playback. The details of an effect are determined through combination of sub effects, based on the music tempo or others of the BGM corresponding to the template. The sub effect is plurally provided, each indicating which part of a still image is to be displayed at where in the screen with which size, and which direction the image is to be moved, for example. The "effect type" in the template designates the combination of such sub effects, for example.

The "image display order" is information for use to designate the display order for the still images stored in the photo album designated by the "photo album" in the playlist. The display order designated by the "image display order" includes "at random", "in chronological order", or "in sequential order", for example. Here, the expression of "in chronological order" denotes the order of image capture time that is provided to each of the still images as attribute information, and the expression of "in sequential order" denotes the order of storage in a folder.

The "method for image decimation" is information for use to designate how image decimation is to be performed with respect to the still images stored in a photo album. Based on the "method for image decimation", the playback time of the still images is so adjusted as to be substantially the same as the playback time of the BGM. Alternatively, the image decimation may be left for the user's setting of ON/OFF. With this being the case, when the image decimation is set to OFF, i.e., no image decimation is requested, every still image in the photo album designated by the "photo album" in the playlist is to be played back.

The "atmosphere" is information for use to indicate what atmosphere will be created if the still images are played back following the template.

The "PPM" is information for use to designate the number of still images for playback (display) per minute. In the information processing device 1, the target still images are to be each played back based on the time designated by the "PPM".

The information processing device 1 executes such processes as above, e.g., process of playing back still images using a playlist and a template, and such processes will be described later by referring to the flowchart.

Figure 4:
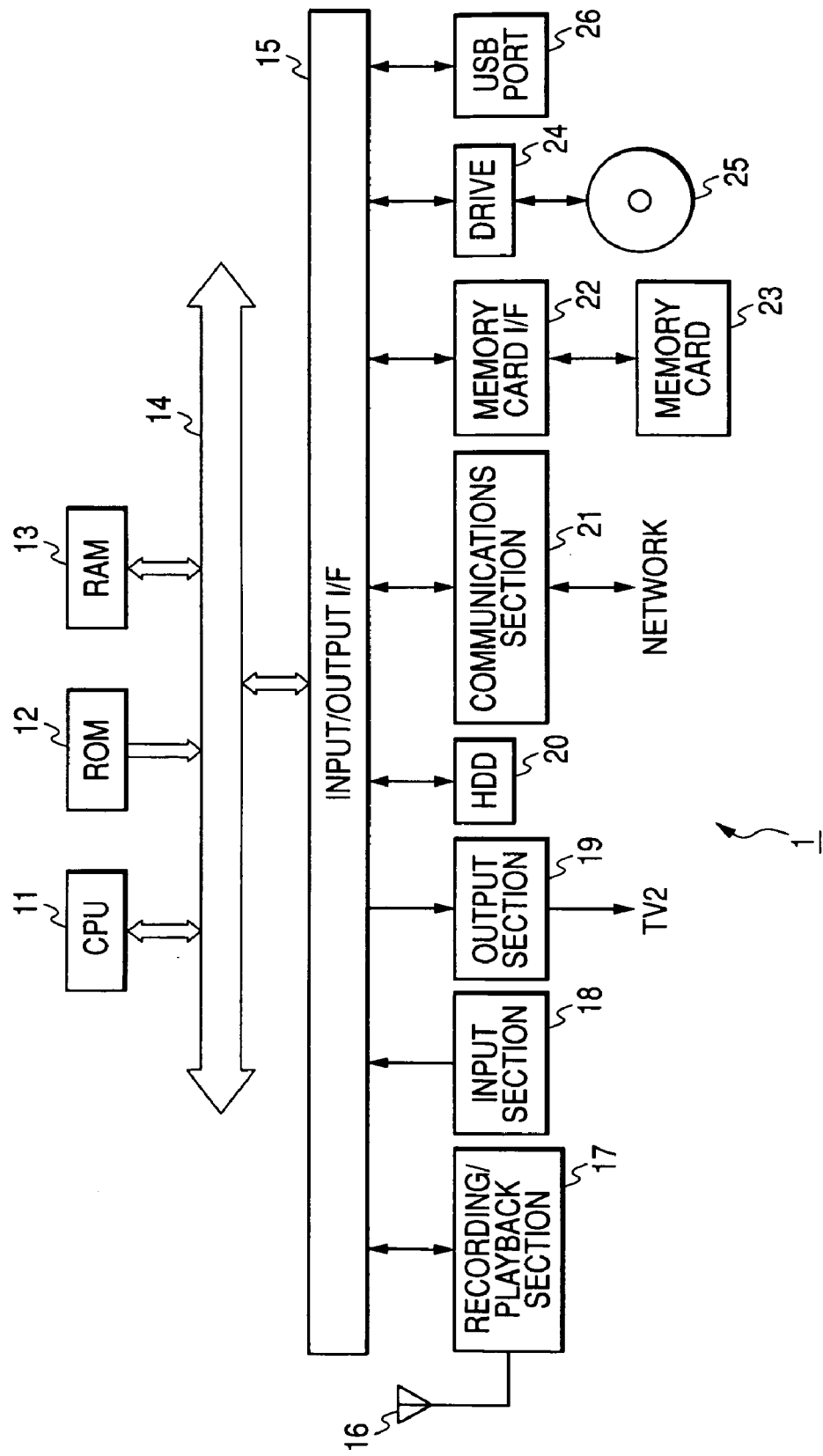
FIG. 4 is a block diagram showing an exemplary configuration of the information processing device.

FIG. 4 is a block diagram showing an exemplary configuration of the information processing device 1 of FIG. 1.

A CPU (Central Processing Unit) 11 is in charge of executing various processes following a program stored in ROM (Read Only Memory) 12, or a program loaded from an HDD 20 into RAM (Random Access Memory) 13. If required, the RAM 13 also stores any data needed for the CPU 11 to execute the various processes.

A connection is established among the CPU 11, the ROM 12, and the RAM 13 through a bus 14. To the bus 14, an input/output interface (hereinafter, input/output I/F) 15 is connected.

The input/output I/F 15 is connected with components of a recording/playback section 17, an input section 18, an output section 19, the HDD 20, a communications section 21, a memory card I/F 22, a drive 24, and a USB port 26.

The recording/playback section 17 compresses, exemplarily with MPEG2 (Moving Picture Experts Group), data about a television program acquired from signals coming from an antenna 16. The resulting compressed data (video content) is then provided to the HDD 20 for storage therein through the input/output I/F 15. The recording/playback section 17 also expands the video content stored in the HDD 20, and outputs the resulting image data about the television program from the output section 19 to the TV 2. As such, the information processing device 1 has a feature of recording and playing back television programs.

The input section 18 is exemplified by an infrared receiver. The input section 18 receives signals coming from a remote controller that is not shown, and outputs information indicating the user's manipulation details to the CPU 11.

The output section 19 converts the image data coming through the input/output I/F 15 into analog signals, and outputs the resulting image signals to the TV 2 through a cable. The output section 19 receives image data as a result of playing back still images in accordance with a playlist, image data of a video content played back by the recording/playback section 17, and others. The output section 19 also converts music data coming through the input/output I/F 15 into analog signals, and outputs the resulting signals to the TV 2.

The HDD 20 stores video contents derived by the recording/playback section 17, still images captured from the memory card 23 through the memory card I/F 22, still images captured by a digital camera through the USB port 26 and a USB cable, and music data (audio contents) captured by the drive 24 from an optical disk 25, and compressed with MP3 (MPEG Audio Layer-3), for example.

The HDD 20 also stores playlists created based on the user's selections, data about BGMs, templates corresponding to the BGMs, slide show contents, and others.

The communications section 21 is in charge of a communications process over a network.

The memory card I/F 22 reads data stored in the memory card 23 for storage into the HDD 20 or others. Here, the memory card 23 is inserted in a memory card slot, which is formed to the cabinet of the information processing device 1. Through such a memory card 23, data about still images or others is captured into the information processing device 1.

The drive 24 drives the optical disk 25 inserted therein for data reading/writing from/to the optical disk 25. The optical disk 25 is exemplified by a CD (Compact Disk) or DVD (Digital Versatile Disk), and also through such an optical disk 25, data about still images, audio contents, video contents, or others is captured into the information processing device 1. The drive 24 writes onto the optical disk 25 any created slide show contents as appropriate.

The information processing device 1 also serves as a game machine. Images of games (programs) read by the drive 24 from the optical disk 25 are also provided to the output section 19 through the input/output I/F 15, and then to the TV 2.

The USB port 26 communicates with external equipment such as digital cameras through the USB cable, and any captured still images are stored in the HDD 20.

FIG. 5 is a block diagram showing an exemplary function configuration of the information processing device 1. The components of FIG. 5 are at least partially implemented by the CPU 11 of FIG. 4 executing any predetermined program.

The information processing device 1 is configured to include a content management section 31, a BGM/template management section 32, a slide show content creation section 33, a playback section 34, a playlist creation section 35, and an output control section 36.

The content management section 31 keeps track of the storage contents in the HDD 20, e.g., still images, and various types of contents including video contents, audio contents, playlists, and others. Such information about contents under the management of the content management section 31 is forwarded to the output control section 36 for use to display a menu screen, which will be described later.

When a playlist is created, the content management section 31 provides the playlist creation section 35 with information including the title of the photo album selected by the user, or others. When the playlist is played back, the content management section 31 reads from the HDD 20 the photo album found in the playlist as a playback target, i.e., the photo album designated by the "photo album" in the playlist. Thus read photo album is forwarded to the playback section 34. The content management section 31 also stores in the HDD 20 a slide show content created and provided by the slide show content creation section 33.

The BGM/template management section 32 keeps track of BGMs and templates with a one-to-one correspondence thereamong for storage into the HDD 20. When a playlist is created, the BGM/template management section 32 outputs to the output control section 35 information about the BGMs, and to the playlist creation section 35 the BGM selected by the user, and the template corresponding thereto. When the playlist is played back, the BGM/template management section 32 outputs to the playback section 34 the template designated by the "corresponding template" in the playlist, and the BGM designated by the "music tune for use" therein.

The slide show content creation section 33 compresses the playback result derived by the playback section 34, i.e., the playback order of a plurality of still images sequentially played back in accordance with the playlist, so that a slide show content of MPEG2 format is created, for example. The slide show content created by the slide show content creation section 33 as such is forwarded to the content management section 31 for storage into the HDD 20.

When a command comes for playing back the playlist, the playback section 34 acquires the playlist requested for playback, the photo album designated by the "photo album" in the playlist, and the BGM designated by the "music tune for use" in the playlist, and then plays back the playlist.

FIG. 6 is a block diagram showing in detail an exemplary configuration of the playback section 34.

The playback section 34 is configured to include a playlist analysis section 41, an extraction section 42, a still image playback section 43, and a BGM playback section 44.

When the playlist comes from the content management section 31 for playback requested by the user, the playlist analysis section 41 analyzes the playlist, and provides the BGM playback section 44 with identification information about the BGM designated by the "music tune for use" in the playlist. The playlist analysis section 41 acquires from the BGM/template management section 32 the template designated by the "corresponding template" in the playlist, and forwards thus acquired template to both the extraction section 42 and the still image playback section 43. The extraction section 42 is also provided with information about the one-time playback time of the BGM, for example.

Based on the "method for image decimation" (FIG. 3) found in the template provided by the playlist analysis section 41, the extraction section 42 decimates the still images stored in the photo album provided by the content management section 31 so that a group of still images is extracted for playback. As a result, the playback time of the still images is so adjusted as to be substantially the same as the playback time of the BGM. The group of still images extracted by the extraction section 42 as such is output to the still image playback time 43 as target still images for playback.

When the image decimation is set to OFF, the extraction section 42 performs no image decimation with respect to the still images, and forwards to the still image playback section 43 every still image stored in the photo album provided by the content management section 31 as target still images for playback.

The still image playback section 43 plays back the still images coming from the extraction section 42 after applying effects thereto as designated by the "effect type" in the template provided by the playlist analysis section 41. The effect-applied still images are played back in order designated by the "image display order" also in the template. The still images are played back at the timing set by the "PPM" in the template. The still images played back by the still image playback section 43, i.e., effect-applied still images, are forwarded to the output control section 36 for display on the TV 2 thereby.

Based on the identification information provided by the playlist analysis section 41, the BGM playback section 44 acquires the corresponding BGM from the BGM/template management section 32. Thus acquired BGM is played back in tune with the still images played back by the still image playback section 43. The BGM played back by the BGM playback section 44 is also forwarded to the output control section 36 for display on the TV 2 thereby, for example.

The playback section 34 configured as such plays back the playlist in response also to a user's command asking for preview playback of the playlist in the course of creation. When such a user's command asking for preview playback of the playlist comes, the playlist creation section 35 provides the playback section 34 with the not-yet-completed playlist. The playlist is then played back by the components of FIG. 6.

Referring back to FIG. 5, the playlist creation section 35 creates such a playlist as shown in FIG. 2, including information about the user-selected photo album, information about the user-selected BGM, information about the template corresponding to the BGM, and others. The resulting created playlist is forwarded to the content management section 31 or the playback section 34. The information about the photo album selected by the user during the playlist creation is provided by the content management section 31, and the information about the BGM and its corresponding template is provided by the BGM/template management section 32.

Based on the information coming from the content management section 31, the BGM/template management section 32, and the playback section 34, the output control section 36 performs screen display on the TV 2. Displayed at this time are a wizard screen showing the user how to create a playlist, and a menu screen as an initial screen for manipulations using the information processing device 1.

Described here is the menu screen to be displayed on the TV 2 by the output control section 36.

Figure 8:
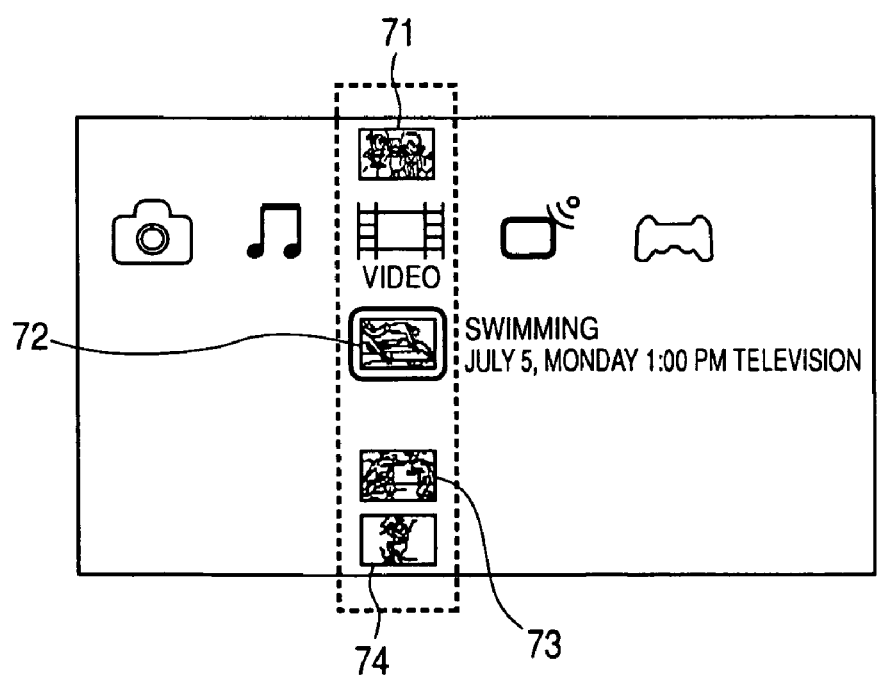
FIG. 8 is a diagram showing another exemplary menu screen.

FIGS. 7 and 8 are both a diagram showing an exemplary menu screen.

As dot-lined in FIG. 7, the menu screen includes category icons 51 to 55 in the lateral direction indicating each corresponding category. As dot-lined in FIG. 8, the menu screen also includes content icons, i.e., video content icons 71 to 74, in the vertical direction that is orthogonal to the direction along which the category icons 51 to 55 are arranged. Such content icons each indicate a content belonging to the category selected by the user. Note here that the dotted lines in FIGS. 7 and 8 are those provided for the sake of convenience, and do not appear on the menu screen in the real-word setting.

In FIGS. 7 and 8 examples, the menu screen includes the category icon 51 of "photo", the category icon 52 of "music", the category icon 53 of "video", the category icon 54 of "television", and the category icon 55 of "game", from the left to right of the screen in order.

FIGS. 7 and 8 examples are both showing a case where the user selects the category of "video", and thus the content icons 71 to 74 are displayed in the vertical direction, indicating the video contents for the category of "video". Out of these content icons 71 to 74, the content icon 72 is assumed as being selected, and next to the content icon 72, displayed are the title or others of the video content for the content icon 72.

In such a menu screen, basically, the user is allowed to make a category selection by manipulating the remote controller in the lateral direction, i.e., right and left buttons, and to make a content selection out of those belonging to the selected category by manipulating the remote controller in the vertical direction, i.e., top and bottom buttons.

In response to the user's manipulation as such, the menu screen is scrolled as a piece with the category icons 51 to 55 (including any other category icons not displayed in FIGS. 7 and 8 example), and the content icons 71 to 75 (including any other content icons not displayed in FIGS. 7 and 8 examples).

Assuming that the user depresses once the left button in the state of FIG. 7, i.e., the category of "video" is selected, the category icons 51 to 55 move rightward in its entirety. That is, the category icon 52 will move to the position at which the category icon 53 is currently displayed, and the category icon 51 will move to the position at which the category icon 52 is currently displayed.

Similarly, the category icon 53 will move to the position at which the category icon 54 is currently displayed, and the category icon 54 will move to the position at which the category icon 55 is currently displayed. At the current position of the category icon 51, displayed is a category icon not shown in FIGS. 7 and 8 examples but located left to the category icon 51.

As such, the category selection is changed from "video" to "music", and the content icons representing the audio contents for the category of "music" are accordingly displayed in the vertical direction.

Assuming that the user depresses once the right button in the state of FIG. 7, the category icons 51 to 55 move in its entirety in the opposite direction when the left button is depressed, i.e., leftward. As a result, the category selection is changed to "television".

Assuming also that the user depresses once the top button in the state of FIG. 7, i.e., the content icons 71 to 74 are displayed, the content icons 71 to 74 move upward in its entirety. That is, the content icon 72 will move to the position at which the content icon 71 is currently displayed, and the content icon 73 will move to the position at which the content icon 72 is currently displayed.

Similarly, the content icon 74 will move to the position at which the content icon 73 is currently displayed. At the current position of the content icon 74, displayed is a content icon not shown in FIGS. 7 and 8 examples but located below to the content icon 74.

The content selection is thus changed from the content icon 72 to the content icon 73. After content selection change as such, displayed next to the content icon 73 is the title of the video content corresponding to the content icon 73, for example.

Assuming that the user depresses once the bottom button in the state of FIG. 7, the content icons 71 to 74 move in its entirety in the opposite direction when the top button is depressed, i.e., downward. As a result, the content selection is changed to the content icon 71.

After making selections of category and content as such, the user manipulates the remote controller to select the enter button so that a sub menu appears on the display. The sub menu shows a list of manipulations available with the currently-selected content. Using the sub menu to be displayed after selecting a specific content, the user can make selections about the content, e.g., playback, copy, edit, delete, and others.

By referring to the flowcharts of FIGS. 9 to 11, described next is a playlist creation process to be executed by the information processing device 1.

In step S1, the output control section 36 displays such a menu screen as described by referring to FIGS. 7 and 8. When the category of "photo" is selected in the menu screen, an icon of a wizard for use of playlist creation or correction is displayed next to the content icon for the photo album.

Figure 9:
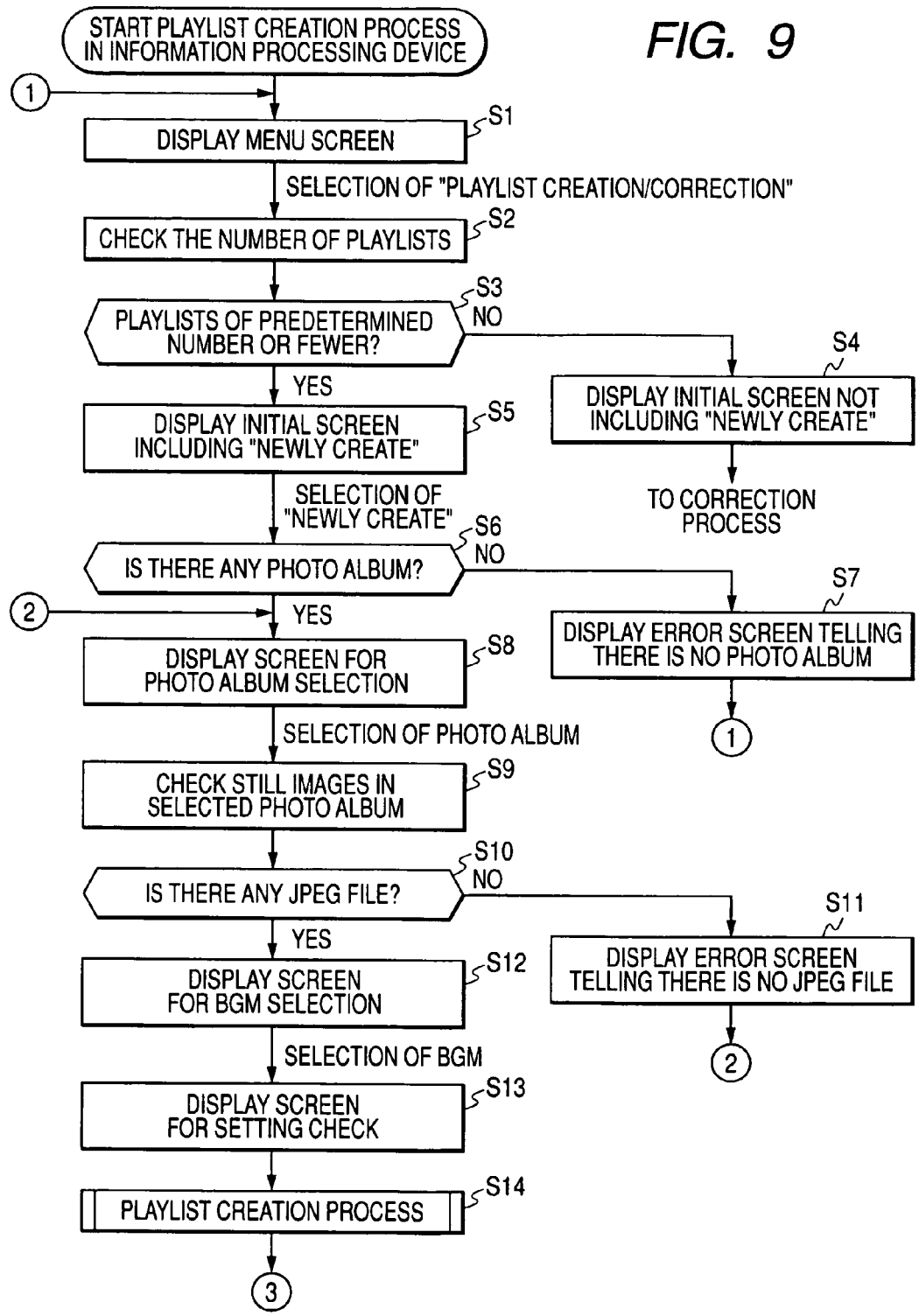
FIG. 9 is the first one third of a flowchart illustrating a playlist creation process in the information processing device.
Figures 12, 13, 14:
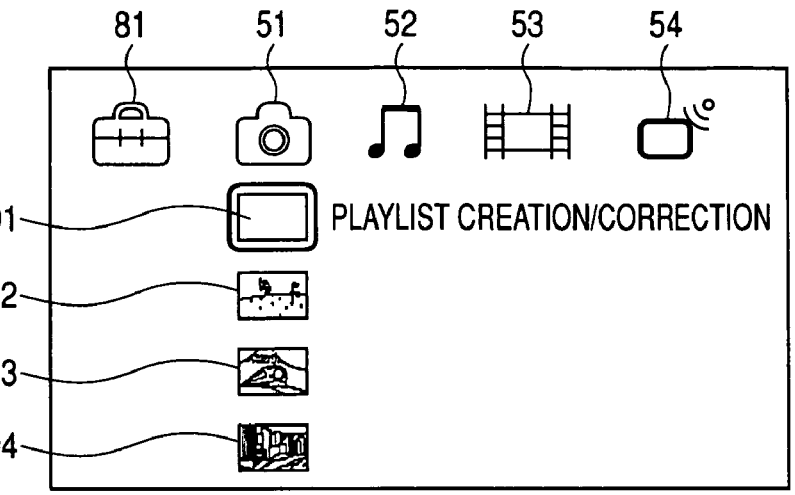
FIG. 12 is a diagram showing an exemplary screen to be displayed in step S1 of FIG. 9.
FIG. 13 is a diagram showing an exemplary screen to be displayed in step S4 of FIG. 9.
FIG. 14 is a diagram showing an exemplary screen to be displayed in step S5 of FIG. 9.

FIG. 12 is a diagram showing an exemplary menu screen to be displayed in step S1 of FIG. 9. Therein, any components similar to those of FIG. 7 or others are provided with the same reference numerals.

FIG. 12 is showing the menu screen with the category of "photo" selected, and below the category icon 51, displayed are a wizard icon 91, and content icons 92 to 94 each representing a photo album. In FIG. 12 example, the wizard icon 91 is assumed as being selected, and the text of "playlist creation/correction" is displayed right to the icon 91. Also in FIG. 12 example, a category icon 81 is displayed left to the category icon 51, indicating the category for various settings.

When the user depresses the enter button in the state of FIG. 12 in which the icon 91 is selected in the menu screen, i.e., when a command comes for wizard activation, the procedure goes to step S2.

In step S2, the content management section 31 checks the HDD 20 to see how many playlists are stored therein after created, and the procedure then goes to step S3. In step S3, the content management section 31 determines whether the playlists are of a predetermined number or fewer. That is, in this example, the number of playlists is set with an upper limit, and if the number of the playlists is at the upper limit, no more playlist creation is allowed.

In step S3, when the content management section 31 determines that the number of the playlists is not equal to or fewer than the predetermined number, i.e., is reaching the upper limit, a notification is made to the output control section 36. The procedure then goes to step S4.

In step S4, the output control section 36 displays an initial screen that carries no option of creating a new playlist.

FIG. 13 is a diagram showing an exemplary initial screen to be displayed in step S4 of FIG. 9.

The initial screen of FIG. 13 is displaying a message of "Use Photos in Album as a basis to Make New Playlist or Correct Existing Playlist". Below such a message, a text of "Correct" is also displayed as an option of correcting any existing playlist.

After the text of "Correct" is selected and highlighted, the user manipulates the remote controller to depress the enter button so that any existing playlist can be corrected. In response when the text of "Correct" is selected, the playlist creation process of FIGS. 9 to 11 is ended, and a playlist correction process is started. The playlist correction process is not described herein.

On the other hand, when the content management section 31 determines in step S3 that the number of the playlists is equal to or fewer than the predetermined number, a notification is made to the output control section 36. The procedure then goes to step S5.

In step S5, the output control section 36 displays an initial screen that carries an option of creating a new playlist.

FIG. 14 is a diagram showing an exemplary initial screen to be displayed in step S5 of FIG. 9.

The screen of FIG. 14 is the same as that of FIG. 13, except that the text of "Newly Create" is displayed over the text of "Correct". When the user depresses the enter button after selecting the text of "Newly Create", a playlist newly creation process is started. The procedure then goes to step S6.

In step S6, the content management section 31 determines whether the HDD 20 is storing any photo album. If determines that no photo album is stored, the content management section 31 makes a notification to the output control section 36. The procedure then goes to step S7.

In step S7, the output control section 36 displays an error screen telling that there is no photo album.

Figures 15, 16, 17:
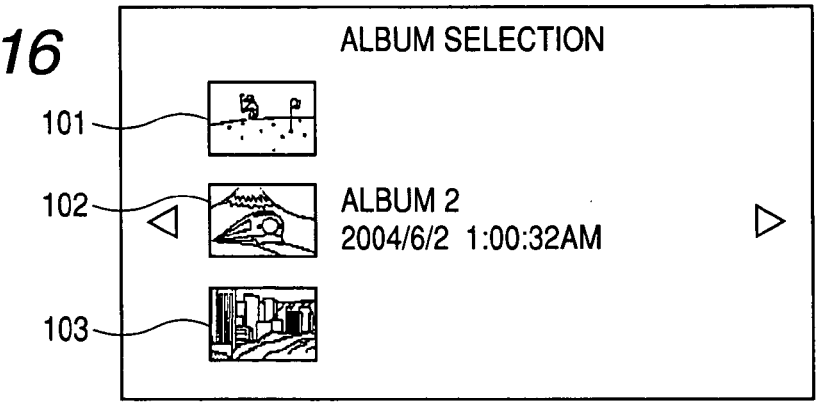
FIG. 15 is a diagram showing an exemplary screen to be displayed in step S7 of FIG. 9.
FIG. 16 is a diagram showing an exemplary screen to be displayed in step S8 of FIG. 9.
FIG. 17 is a diagram showing an exemplary screen to be displayed in step S11 of FIG. 9.

FIG. 15 is a diagram showing an exemplary screen to be displayed in step S7 of FIG. 9.

The screen of FIG. 15 is displaying a message of "No Album is Found for Playlist Creation. End of Playlist Creation/Correction". As described above, in the information processing device 1, selecting a photo album means selecting still images for playback for a slide show. Therefore, when there is no photo album, the user cannot make selections of still images for playback. The procedure then returns to step S1 for the further processes.

On the other hand, when determines in step S6 that the HDD 20 is storing a photo album(s), the content management section 31 makes a notification to the output control section 36, and outputs information about the photo album(s) stored in the HDD 20 to the output control section 36. Here, the information includes the title(s) of the photo album(s), icon image(s), and others. The procedure then goes to step S8.

In step S8, the output control section 36 displays a selection screen for the photo album(s).

FIG. 16 is a diagram showing an exemplary selection screen to be displayed in step S8 of FIG. 9.

The screen of FIG. 16 is displaying icons 101 to 103 for three photo albums, respectively. In FIG. 16 example, the icon 102 is assumed as being selected. Displayed right to the icon 102 are the title of the corresponding photo album, i.e., "album 2", and the time and day when the photo album is created (captured), i.e., "2004 Jun. 2 1:00:32 AM". Using the screen of FIG. 16 as such, the user can make a selection of photo album whichever he or she wants or needs.

After any specific photo album is selected, in step S9, the content management section 31 checks the format of the still images stored in the selected photo album. The procedure then goes to step S10, and the content management section 31 determines whether the selected photo album carries any still images (JPEG files) compressed by JPEG (Joint Photographic Exert Group). That is, in this example, JPEG files are to be processed as still images.

In step S10, when determines that there is no JPEG file in the photo album selected by the user, the content management section 31 makes a notification to the output control section 36. The procedure then goes to step S11.

In step S11, the output control section 36 displays an error screen telling that there is no JPEG file.

FIG. 17 is a diagram showing an exemplary error screen to be displayed in step S11 of FIG. 9.

The screen of FIG. 17 is displaying a message of "No File is Found for use for Playlist Creation. Make Album Selection Again". After this screen is displayed, the procedure returns to step S8 so that a photo album selection is made again.

On the other hand, when determines in step S10 that the photo album selected by the user carries a JPEG file(s), the content management section 31 makes a notification to the output control section 36. The procedure then goes to step S12.

In step S12, the output control section 36 displays a selection screen for BGMs. The information about the BGMs, e.g., title or icon, is provided by the BGM/template management section 32.

FIG. 18 is a diagram showing an exemplary selection screen to be displayed in step S12 of FIG. 9.

The screen of FIG. 18 is displaying icons 111 to 113 for three BGMs, respectively. In FIG. 18 example, the icon 112 is assumed as being selected. Displayed right to the icon 112 is the title of the corresponding BGM, i.e., "Music 1". Using the screen of FIG. 18 as such, the user can make a selection of BGM whichever he or she prefers for use as a BGM for a slide show. As described above, the one-to-one correspondence is established between the BGM and the template, and thus a BGM selection here also means a template selection.

After any specific BGM is selected, in step S13, the output control section 36 displays a check screen for the selection details, i.e., setting about a playlist to be created.

FIG. 19 is a diagram showing an exemplary check screen to be displayed in step S13 of FIG. 9.

The screen of FIG. 19 is displaying the title of the user-selected photo album, i.e., "Trip Memories", the title of the user-selected BGM, i.e., "Music 1", and the playback time of the "Music 1", i.e., "2:00". This screen gives the user the option of checking the setting details, and deciding whether or not to create a playlist with such setting details.

When a command comes for playlist creation, a playlist creation process is executed in step S14. By going though this playlist creation process, the playlist creation section 35 creates such a playlist as shown in FIG. 2 based on the user's selections. The playlist creation process will be described in detail later by referring to the flowchart of FIG. 32. Note here that the playlist to be created is set with no "playlist title" (FIG. 2) yet.

As such, mainly, the user manipulates the device for twice to make selections of a photo album and a BGM so that a playlist can be created.

Figure 10:
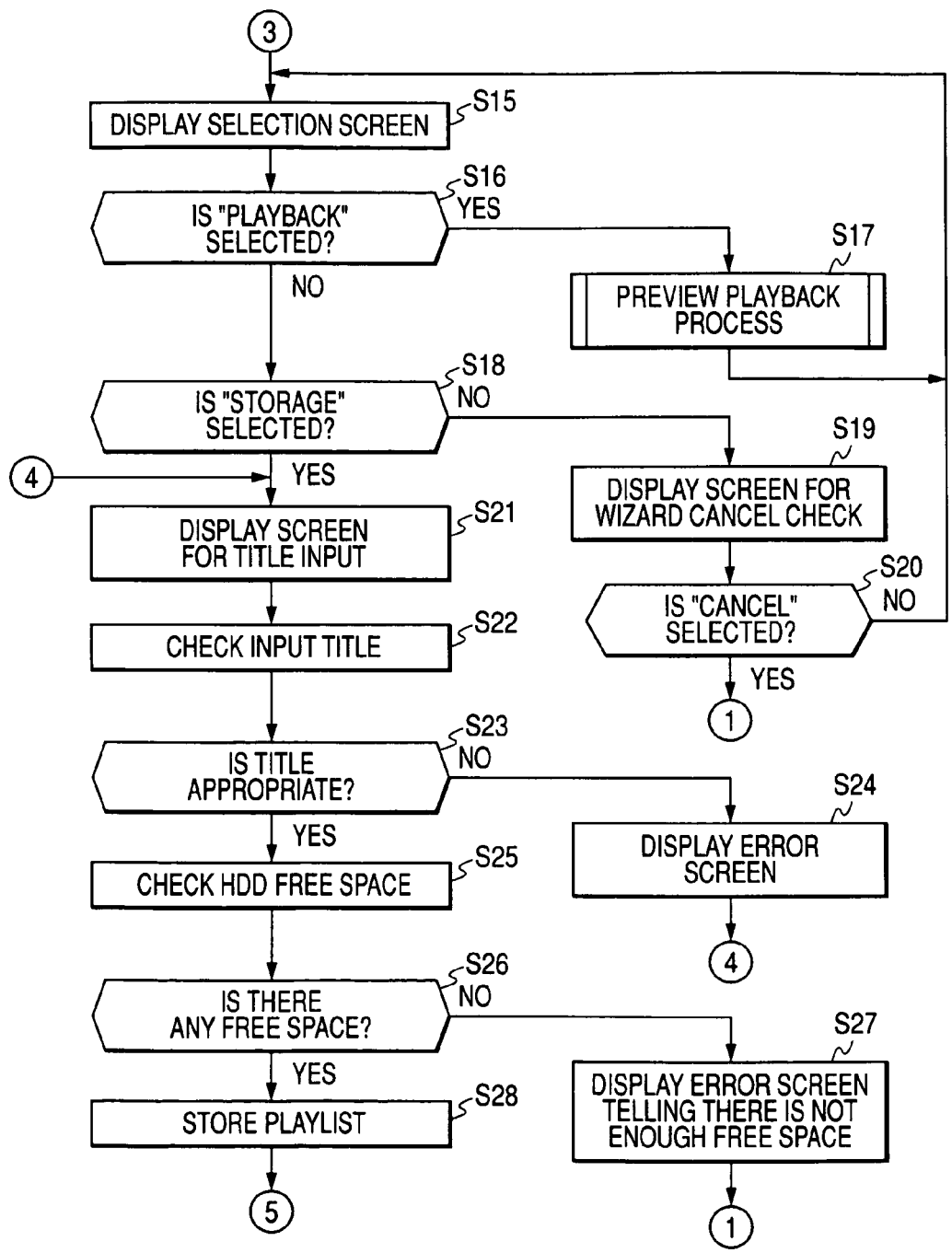
FIG. 10 is the second one third of the flowchart illustrating the playlist creation process in the information processing device.

After a playlist is created, in step S15 of FIG. 10, the output control section 36 displays a selection screen for options of preview playback of the playlist, playlist storage, or others.

FIG. 20 is a diagram showing an exemplary selection screen to be displayed in step S15 of FIG. 10.

The selection screen of FIG. 20 is displaying a playback button 121, a storage button 122, and a cancel button 123. The playback button 121 is operated for preview playback of the playlist created in step S14. The storage button 122 is operated for storing the playlist, and the cancel button 123 is operated for canceling the further processes.

In step S16, the playlist creation section 35 determines whether the playback button 121 of FIG. 20 is operated, and the preview playback is selected. When determines that the preview playback is selected, the playlist creation section 35 outputs the playlist created in the process of step S14 to the playback section 34.

In step S17, the preview playback process is executed and the playlist created in the process of step S14 is accordingly played back. Through such playlist preview, the user can check how the still images look like with the playback order defined by the playlist. The preview playback process will be described in detail by referring to the flowchart of FIG. 33. After the preview playback process is ended, the procedure returns to step S15 for the further processes.

On the other hand, in step S16, when the playlist creation section 35 determines that no selection is made for playlist preview, the procedure goes to step S18. In step S18, a determination is made whether the storage button 122 is operated for storage of the playlist.

In step S18, when determines that no selection is made for storage of the playlist, the playlist creation section 35 determines that the cancel button 123 is operated, and makes a notification to the output control section 36. Thereafter, the procedure goes to step S19.

In step S19, the output control section 36 displays a screen for wizard cancel check.

Figures 21, 22, 23:
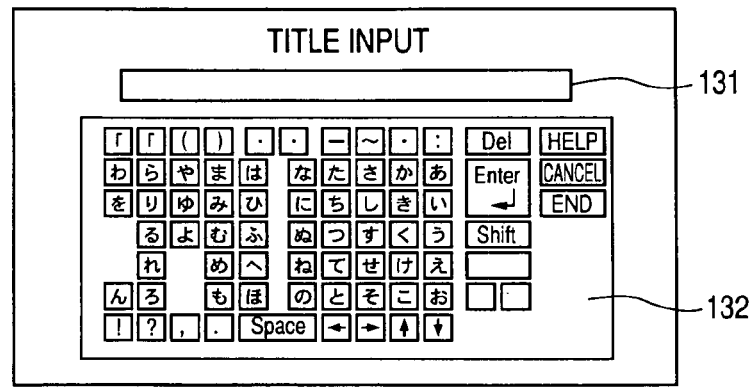
FIG. 21 is a diagram showing an exemplary screen to be displayed in step S19 of FIG. 10.
FIG. 22 is a diagram showing an exemplary screen to be displayed in step S21 of FIG. 10.
FIG. 23 is a diagram showing an exemplary screen to be displayed in step S24 of FIG. 10.

FIG. 21 is a diagram showing an exemplary screen for wizard cancel check to be displayed in step S19 of FIG. 10.

The screen of FIG. 21 is displaying a message telling "Cancel Playlist Creation/Correction. Do You Really Want to?", and the texts of "Yes" and "No" are displayed therebelow. The user may select the text of "Yes" to end the playlist creation, and the text of "No" to continue the playlist creation.

In step S20, the output control section 36 determines whether a selection is made to cancel the playlist creation, i.e., whether the text of "Yes" of FIG. 21 is selected. When the output control section 36 determines that such a cancel selection is made, the procedure returns to step S1 for the further processes. On the other hand, when the output control section 36 determines in step S20 that no cancel selection is made, the procedure returns to step S15 for the further processes.

When determines in step S18 that a selection is made for storage of the playlist, the playlist creation section 35 makes a notification to the output control section 36, and the procedure goes to step S21. When such a playlist storage selection is made, the playlist created in the process of step S14 is forwarded from the playlist creation section 35 to the content management section 31.

In step S21, the output control section 36 displays an input screen for the title of the playlist, i.e., playlist title.

FIG. 22 is a diagram showing an exemplary input screen to be displayed in step S21 of FIG. 10.

The screen of FIG. 22 is displaying a title input field 131, and a keyboard 132 (software keyboard) therebelow. In the title input field 131, the title input by the user is to be displayed. The user manipulates the keyboard 132 for input of the playlist title.

When the playlist title is input, in step S22, the content management section 31 checks the title. The procedure then goes to step S23, and the content management section 31 determines whether the title is appropriate.

In step S23, when determines that the title is not appropriate, the content management section 31 makes a notification to the output control section 36, and the procedure goes to step S24. For example, the title is determined as not being appropriate if the same playlist title is already exiting, when the title includes any use-prohibited letters and signs, and others.

In step S24, the output control section 36 displays an error screen telling that the input title is not appropriate.

Figures 24, 25, 26:
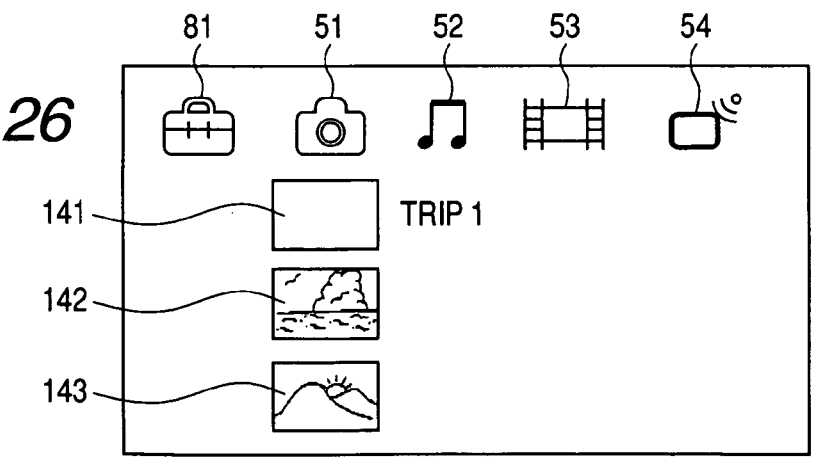
FIG. 24 is a diagram showing an exemplary screen to be displayed in step S24 of FIG. 10.
FIG. 25 is a diagram showing an exemplary screen to be displayed in step S27 of FIG. 10.
FIG. 26 is a diagram showing still another exemplary menu screen.

FIGS. 23 and 24 are diagrams both showing an exemplary error screen to be displayed in step S24 of FIG. 10.

Specifically, FIG. 23 is a diagram showing an error screen to be displayed when the playlist title is already exiting. The screen of FIG. 23 is displaying a message of "Input Title is Already Existing or Unauthorized. Title Change is Requested".

FIG. 24 is a diagram showing an exemplary error screen to be displayed when the input title includes any use-prohibited letters and signs. The screen of FIG. 24 displays the same message as that of FIG. 23, and additionally displaying a message of "The Following Letters and Signs are not Allowed for Use" together with exemplary use-prohibited letters and signs.

After the error screen is displayed to notify that the title is not appropriate, the procedure returns to step S21, and another title is input again.

On the other hand, in step S23, when the content management section 31 determines that the input title is appropriate, the procedure goes to step S25, and the HDD 20 is checked for its free space.

In steps 26, the content management section 31 determines whether the HDD 20 has enough free space for storage of the playlist. When determines that there is not enough free space, the content management section 31 makes a notification to the output control section 36. The procedure then goes to step S27.

In step S27, the output control section 36 displays an error screen telling that the hard disk space is not enough.

FIG. 25 is a diagram showing an exemplary error screen to be displayed in step S27 of FIG. 10.

The screen of FIG. 25 is displaying a message of "Hard Disk Space is not Enough. Erase Unwanted Titles, Tracks, and Photos. End of Playlist Creation/Correction".

After the error screen is displayed to notify that the hard disk space is not enough, the procedure returns to step S1 for the further processes.

On the other hand, when the content management section 31 determines in step S26 that the HDD 20 has enough free space for the storage of the playlist, the procedure goes to step S28, and the created playlist is stored as a piece of content for the category of "photo". After playlist storage as such, the category of "photo" in the menu screen displays an icon for the stored playlist.

FIG. 26 is a diagram showing an exemplary menu screen additionally displaying a playlist content for the category of "photo".

The screen of FIG. 26 displays the category icons 51 to 54, and the category icon 81 in the lateral direction, and the category of "photo" is assumed as being selected. When the category of "photo" is selected as such, as shown in FIG. 26, displayed below the category icon 51 is an icon 141 for the playlist stored in the process of step S28 of FIG. 10. Displayed right to the icon 141 is the playlist title of "Trip".

As such, the playlist is displayed in the menu screen as a content for the category of "photo" similarly to other still image contents, i.e., photo albums. This thus allows the user to select and play back a playlist in much the same way as any other still image contents. In the screen of FIG. 26, displayed below the icon 141 are content icons 142 and 143 both for a photo album. Here, instead of displaying an icon for a playlist next to an icon for a photo album, a folder may be displayed next to an icon for a photo album, and therebelow, an icon for the created playlist may be displayed.

Figure 11:
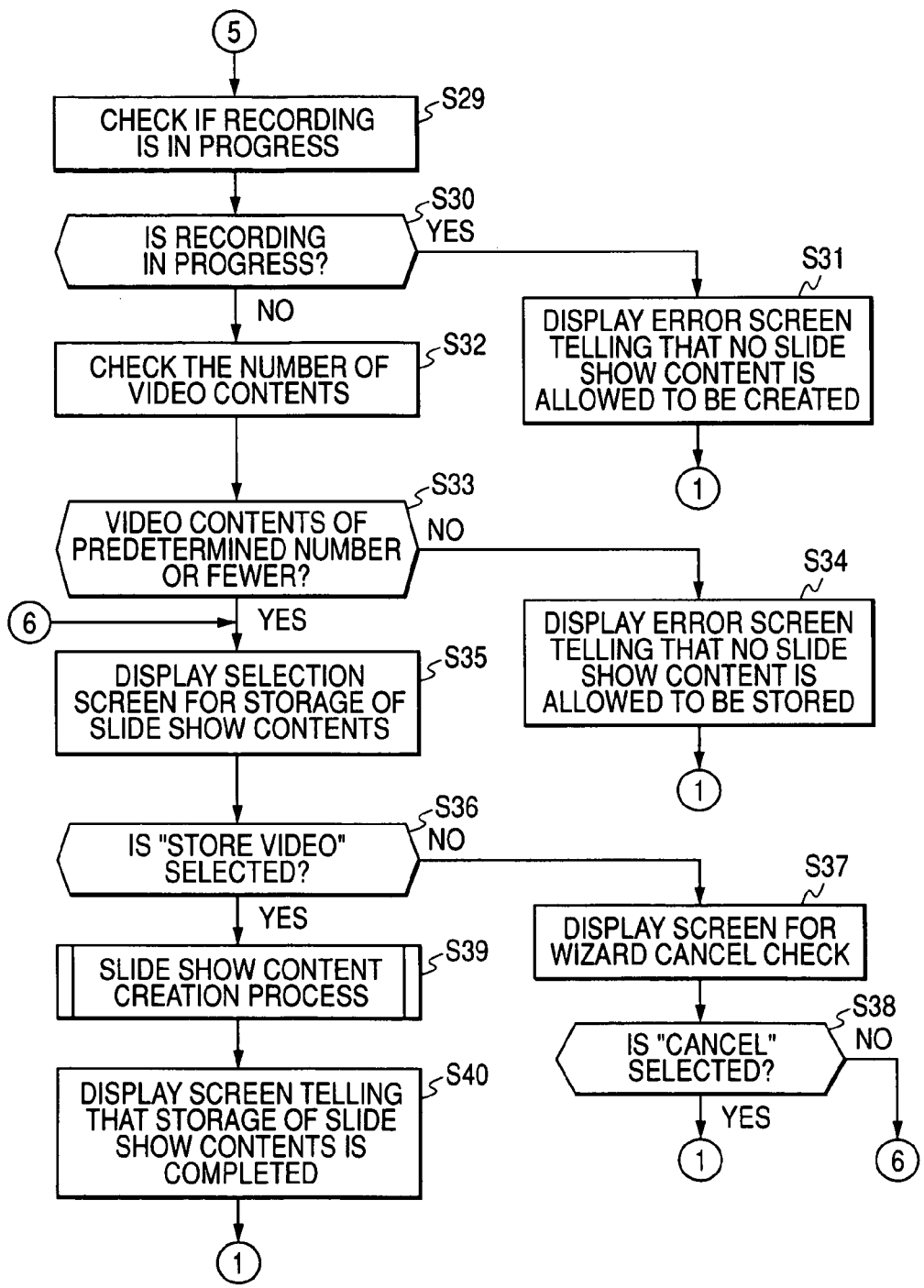
FIG. 11 is the last one third of the flowchart illustrating the playlist creation process in the information processing device.

When the playlist is stored, in step S29 of FIG. 11, the content management section 31 checks whether the recording/playback section 17 is in the process of recording a television program.

As described above, in the information processing device 1, the playback result of the playlist can be stored as a video content (slide show content). In this step, a determination is made whether a slide show content is allowed to be created. That is, when the recording/playback section 17 is already in the process of MPEG2 encoding, e.g., recording of television programs, no slide show content is allowed to be created. This is because, to create a slide show content, the playback result of the playlist, i.e., a series of effect-applied still images (JPEG files), is compressed by MPEG2, for example. Herein, if the recording/playback section 17 is capable of capturing a plurality of contents simultaneously through MPEG2 encoding, step S29 may be skipped.

In step S30, the content management section 31 determines whether the recording/playback section 17 is in the recording process. If determines Yes, the content management section 31 makes a notification to the output control section 36, and the procedure then goes to step S31.

In step S31, the output control section 36 displays an error screen telling that no slide show content is allowed to be created.

FIG. 27 is a diagram showing an exemplary error screen to be displayed in step S31 of FIG. 11.

The screen of FIG. 27 is displaying a message of "Playlist is Stored. No Video Creation is Allowed During Recording. Wait Video Creation from Playlist until Recording is Completed. End of Playlist Creation/Correction". Here, the expression of "Video" in the message denotes "slide show content".

After such an error screen is displayed to tell that no slide show content is allowed to be created, the procedure returns to step S1 for the further processes. From the menu screen, the user selects a playlist icon displayed as a content for the category of "photo". Using the sub menu displayed as a result, i.e., the list of manipulation available with the current playlist, the user can create a slide show content. In the message displayed in the error screen of FIG. 27, the part of "Wait Video Creation from Playlist until Recording is Completed" refers to that.

On the other hand, when the content management section 31 determines in step S30 that the recording/playback section 17 is not in the recording process, i.e., creation of slide show content is allowed, the procedure goes to step S32. The content management section 31 then checks the HDD 20 to see how many video contents are stored therein (including television programs, and slide show contents). That is, in this example, the number of video contents is set with an upper limit for storage into the HDD 20, and if the number of the video contents therein is already reaching the upper limit, no more video content is allowed to be stored.

In step S33, the content management section 31 determines whether the number of video contents is equal to or fewer than the predetermined number. When determines that it is not equal to or fewer than the predetermined number, i.e., is reaching the upper limit, a notification is made to the output control section 36. The procedure then goes to step S34.

In step S34, the output control section 36 displays an error screen telling that no slide show content is allowed to be created (stored).

FIG. 28 is a diagram showing an exemplary error screen to be displayed in step S34 of FIG. 11.

The screen of FIG. 28 is displaying a message of "Disk is Full of Titles. Erase Unwanted Titles, Tracks, and Photos. End of Playlist Creation/Correction."

After such an error screen is displayed to tell that no video content is allowed to be created, the procedure returns to step S1 for the further processes.

On the other hand, in step S33, when determines that the number of the video contents is equal to or fewer than the predetermined number, the content management section 31 makes a notification to the output control section 36, and the procedure goes to step S35.

In step S35, the output control section 36 displays a selection screen giving the user the option of selecting whether or not to store the slide show content.

FIG. 29 is a diagram showing an exemplary selection screen to be displayed in step S35 of FIG. 11.

The screen of FIG. 29 is displaying a message of "Playlist is stored. Select "Video Storage" for Continuous Video Storage. During Video Creation, Only Stop Button is Available for Operation, and No Video Programming is Allowed". Also displayed in the screen are the time required for creating a slide show content, and the start time for the next video programming. During the process of creating a slide show content, no television program is recorded even with video programming. Therefore, this screen displaying the start time for the next video programming helps the user determine whether or not to create the slide show content.

In the lower part of the screen of FIG. 29, displayed are the texts of "Store Video" and "End". The text of "Store Video" is selected to store the slide show content, and the text of "End" is selected to end the process without storing the slide show content. The user manipulates the remote controller to select the text of "Store Video" to store the slide show content into the HDD 20.

In step S36, the content management section 31 determines whether the text of "Store Video" is selected in the selection screen of FIG. 29. When determines that the text of "Store Video" is not selected, i.e., the text of "End" is selected in the selection screen of FIG. 29, the content management section 31 makes a notification to the output control section 36, and the procedure then goes to step S37.

In step S37, the output control section 36 displays a screen for wizard cancel check. The screen for wizard cancel check to be displayed in this step is the same as that of FIG. 21 to be displayed in step S19 of FIG. 10.

In step S38, a determination is made whether the wizard is cancelled in the cancel check screen. If "Yes", the procedure returns to step S1 for the further processes. If "No" in step S38, the procedure returns to step S35 for a selection again about the storage of the slide show content.

In step S36, when the content management section 31 determines that the text of "Store Video" is selected in the selection screen of FIG. 29, the procedure goes to step S39.

In step S39, a slide show content creation process is executed. The resulting slide show content created by the slide show content creation process is forwarded from the slide show content creation section 33 to the content management section 31 for storage into the HDD 20. The details of the slide show content process are left for later description by referring to the flowchart of FIG. 35.

In step S40, the output control section 36 displays a storage completion screen telling that the slide show content is completely stored.

Figure 30:
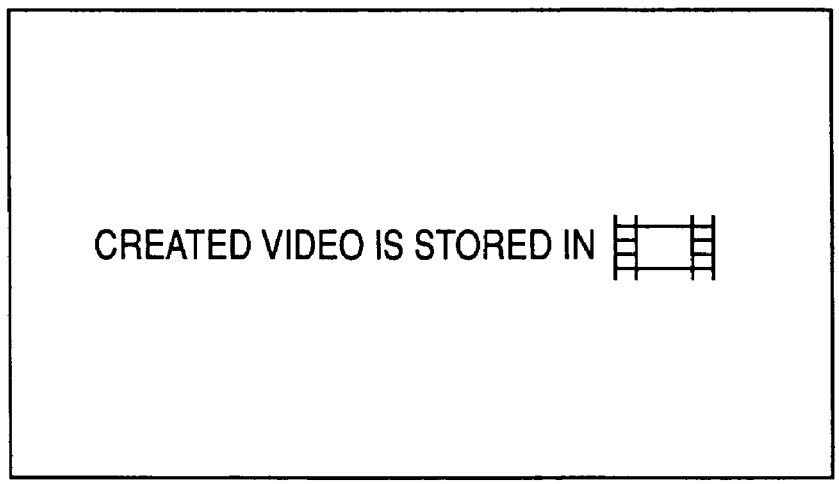
FIG. 30 is a diagram showing an exemplary screen to be displayed in step S40 of FIG. 11.

FIG. 30 is a diagram showing an exemplary storage completion screen to be displayed in step S40 of FIG. 11.

The screen of FIG. 30 is displaying a message telling that the slide show content created in the process of step S39 is stored as a content for the category of "video".

As a result, the category of "video" in the menu screen is displayed additionally with an icon for the slide show content.

Figure 31:
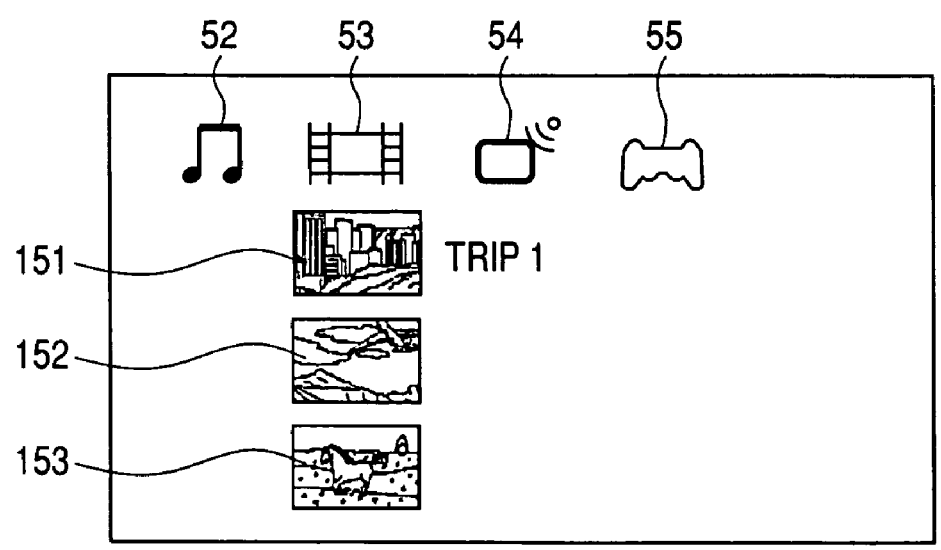
FIG. 31 is a diagram showing still another exemplary menu screen.

FIG. 31 is a diagram showing an exemplary menu screen additionally displaying an icon for the slide show content serving as a content icon for the category of "video".

The screen of FIG. 31 is displaying the category icons 52 to 55 in the lateral direction, and the category of "video" is assumed as being selected. When the category of "video" is selected as such, as shown in FIG. 31, displayed below the category icon 53 is an icon 151 for the slide show content.

Displayed right to the icon 151 is the title of the slide show content, i.e., "Trip 1". That is, the slide show content indicated by the icon 31 of FIG. 31 is the one created using the playback result of the playlist indicated by the icon 141 of FIG. 26, and thus the title of the slide show content is the same as that of the playlist indicated by the icon 141 of FIG. 26.

As such, the slide show content created by the playback result of the playlist is displayed in the menu screen as a content for the category of "video", similarly to other video contents such as television programs. This thus allows the user to select and play back a slide show content in much the same way as any other video contents. In the screen of FIG. 31, displayed below the icon 151 are content icons 152 and 153 both for a video content of television programs.

Note here that, similarly to video contents for any other television programs, the user can write (store) the slide show contents into the optical disk 25, or forward those to other types of equipment through the communications section 21. Accordingly, the user may attach the optical disk 25 written with the slide show content to a player or others to view and listen the slide show content therewith.

By following such a series of image display, mainly, the user can create a playlist with device manipulation for twice to make selections of a photo album, and a BGM. After creating a playlist, the user can create a slide show content if he or she wants to.

Figure 32:
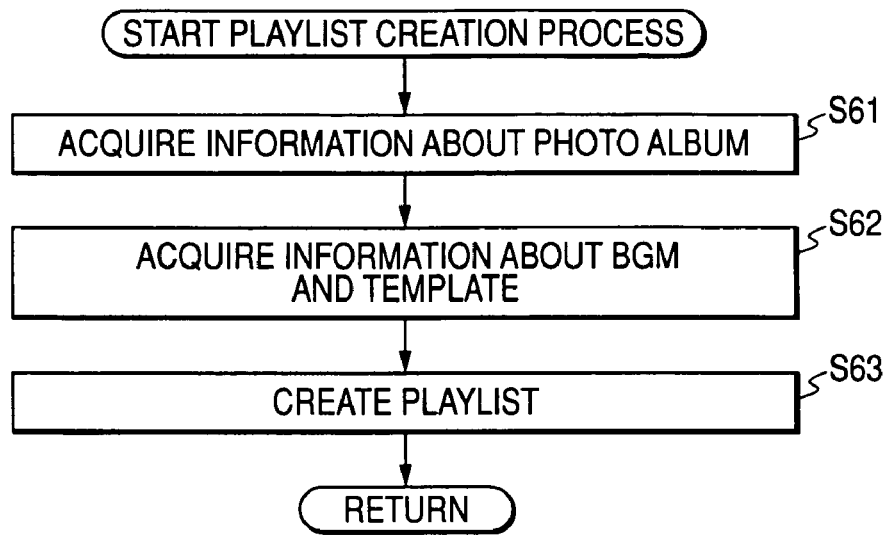
FIG. 32 is a flowchart illustrating the playlist creation process to be executed in step S14 of FIG. 9.

By referring to the flowchart of FIG. 32, described next is a playlist creation process in step S14 of FIG. 9.

In step S61, the playlist creation section 35 acquires identification information including the title of a photo album selected by the user, and the procedure goes to step S62. In step S62, identification information about a BGM selected by the user is acquired together with the identification information about a template corresponding to the BGM. When the user selects any specific photo album, the title thereof or others are provided from the content management section 31. When the user selects any specific BGM, the identification information about the BGM is provided by the BGM/template management section 32 together with the identification information about a template corresponding to the BGM.

In step S63, the playlist creation section 35 creates a playlist by describing the identification information about the photo album acquired in step S61 as the "photo album" (FIG. 2), and the identification information about the BGM and the template acquired in step S62 as the "music tune for use" and "corresponding template", respectively. After the playlist is created as such, the procedure returns to step S14 of FIG. 9 for the further processes.

When the "image of higher priority" is selected by the user, the description thereof is accordingly made. As to the "playlist title", when the user inputs a title (when the title is determined as being appropriate in step S23 of FIG. 10), the description is made to the playlist.

The playlist created as such by the playlist creation section 35 is provided to the playback section 34 when a command comes from the user for preview playback of the playlist. When a command comes for storage of the playlist, the playlist is accordingly provided to the content management section 31.

By referring to the flowchart of FIG. 33, described next is the preview playback process to be executed in step S17 of FIG. 10.

In step S71, the playlist analysis section 41 (FIG. 6) acquires the playlist coming from the playlist creation section 35 for analysis. When a command comes from the user for preview playback of the playlist, the created playlist is responsively provided from the playlist creation section 35.

The playlist analysis section 41 forwards to the BGM playback section 44 the identification information about the BGM designated by the "music tune for use" of the playlist. The playlist analysis section 41 acquires the template designated by the "corresponding template" from the BGM/template management section 32, and forwards the acquisition result to both the extraction section 42 and the still image playback section 43. The extraction 42 is provided also with information about the playback time of the BGM.

In step S72, based on the playback time of the BGM, the extraction section 42 decimates the still images stored in the photo album coming from the content management section 31 so that a group of still images is extracted for playback. The extraction section 42 performs image decimation in accordance with the "method for image decimation" (FIG. 3) for the template provided by the playlist analysis section 41. As exemplary image decimation, the still images stored in the photo album are decimated at random so as to fit in the playback time of the BGM. The group of still images extracted by the extraction section 42 is forwarded to the still image playback section 43.

In step S73, the BGM playback section 44 refers to the identification information about the BGM coming from the playlist analysis section 41 to acquire the BGM from the BGM/template management section 32, and plays back thus acquired BGM. To each of the still images provided by the extraction section 42, the still image playback section 43 applies each corresponding effect designated by the "effect type". The resulting effect-applied still images are played back in the order designated by the "image display order" in the template provided by the playlist analysis section 41.

Figure 34A:
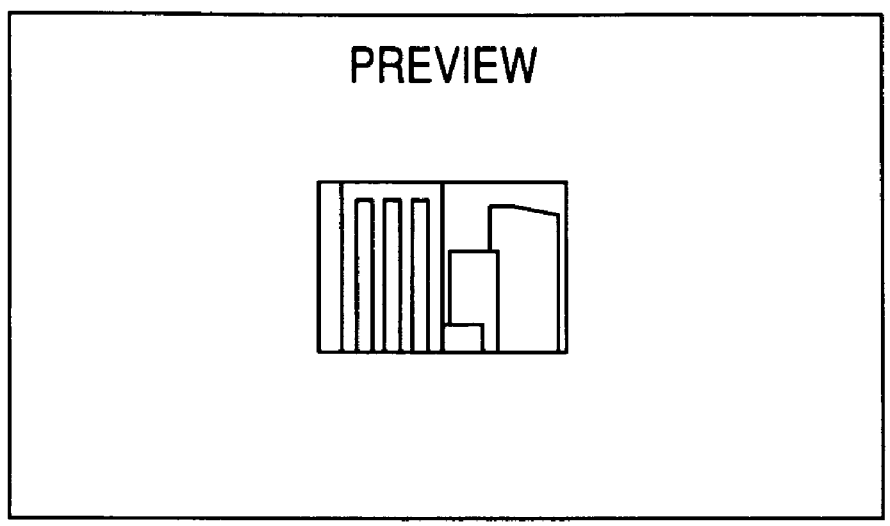
FIG. 34 is a diagram showing an exemplary preview screen.
Figure 34B:
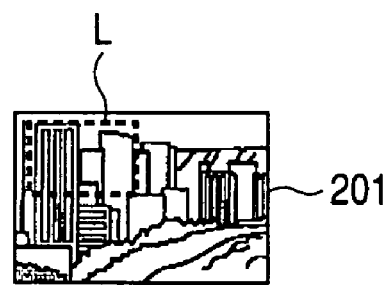

As a result, the TV 2 displays such a screen as shown in FIG. 34A. The screen of FIG. 34A displays the text of "preview" added by the playback section 34, and displayed therebelow is the still image applied with a predetermined effect. The image displayed in the screen of FIG. 34A is a part of a still image 201 of FIG. 34B, i.e., the image 201 is the one captured into the information processing device 1, and a part thereof indicated by a dotted-line L is displayed on the screen of FIG. 34A. In the screen of FIG. 34A, image transition takes place by degrees from the dotted-line part to the remaining parts of the image 201 of FIG. 34B. That is, in this example, the effect applied by the still image playback section 43 is of the type that the part indicated by the dotted line L is initially displayed for the still image 201 of FIG. 34B, and then the remaining parts of the still image 201 are displayed by degrees. The remaining still images are to be applied with such effects varying in type.

Note here that during when the screen of FIG. 34A is being displayed, the BGM played back by the BGM playback section 44 is also output from the speaker of the TV 2 or the speaker connected to the information processing device 1.

In step S74, the still image playback section 43 determines whether the still images are completely played back or not. When the determination is No, the procedure returns to step S73 to repeat to play back the still images.

On the other hand, when the still image playback section 43 determines in step S74 that the still images are completely played back, the procedure returns to step S17 of FIG. 10 for the further processes. Because the still images to be played back are adjusted in number by the extraction section 42, the BGM will be completely played back at substantially the same timing for the still images.

As such, the user can view the preview of the playlist, and make a selection whether or not to store thus created playlist.

When the image decimation is set to OFF by the user, every still image in the photo album is to be played back even if the playback time of the still images is longer than that for the BGM. With this being the case, the BGM may be so set as to be repeatedly played back until the still images are completely played back. This thus prevents the BGM from being ended before the still images are completely displayed, and the remaining still images from being played back without BGM.

By referring to the flowchart of FIG. 35, described next is a slide show content creation process to be executed in step S39 of FIG. 11.

Figure 33:
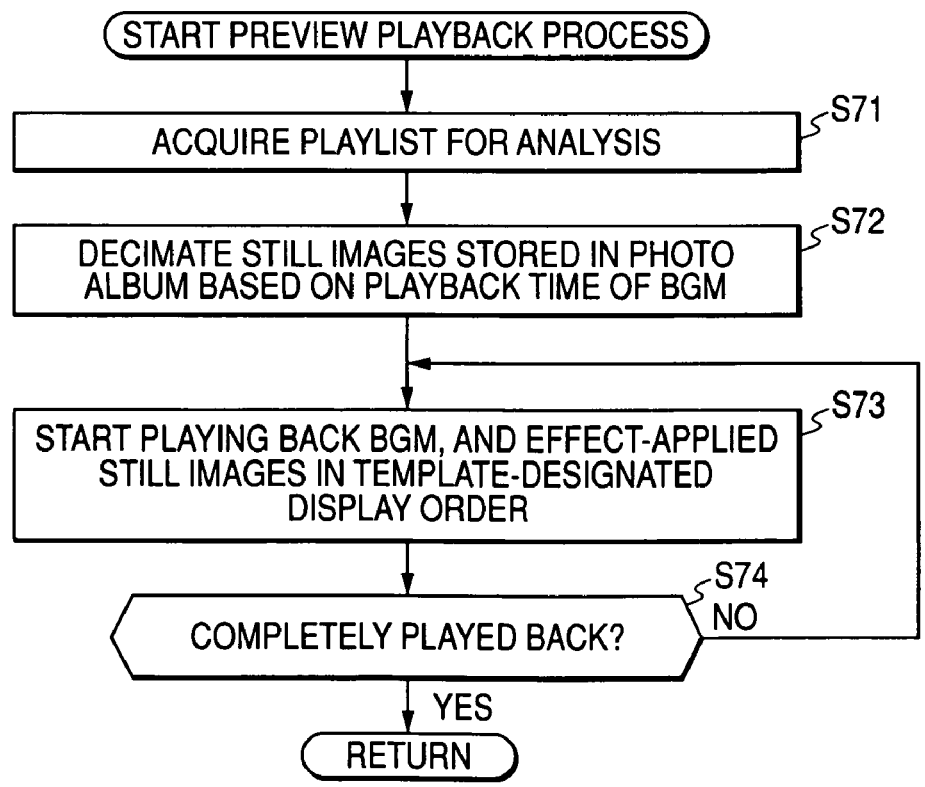
FIG. 33 is a flowchart illustrating a preview playback process to be executed in step S17 of FIG. 10.
Figure 35:
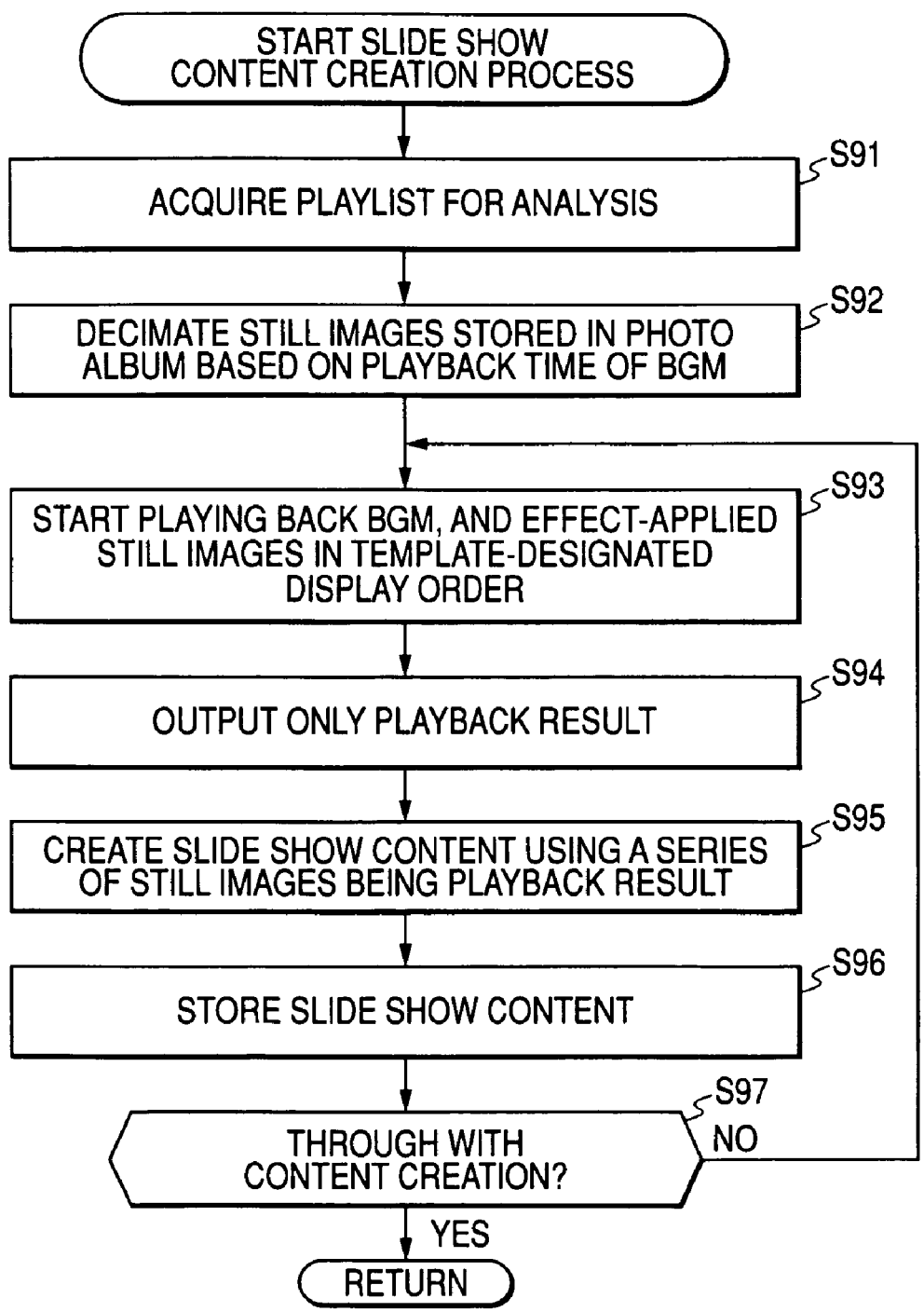
FIG. 35 is a flowchart illustrating a slide show content creation process to be executed in step S39 of FIG. 11.

The processes of steps S91 to S93 of FIG. 35 are similar to those of steps S71 to S73 of FIG. 33. That is, in step S91, the playlist analysis section 41 analyzes the playlist provided by the playlist creation section 35, and the analysis result, i.e., the identification information about the BGM, is forwarded to the BGM playback section 44. The template is forwarded to both the extraction section 42 and the still image playback section 43.

In step S92, the extraction section 42 decimates the still images stored in the photo album, and the procedure then goes to step S93. In step S93, the BGM is played back, and the still images extracted by the extraction section 42 are played back. The still images played back by the still image playback section 43, and the BGM played back by the BGM playback section 44 are all forwarded to the output control section 36 and the slide show content creation section 33.

In step S94, based on the output from the still image playback section 43, the output control section 36 displays only the playback result of the playlist, i.e., a series of effect-applied still images. That is, no such information as "preview" displayed on the screen of FIG. 34 is output.

Figure 36:
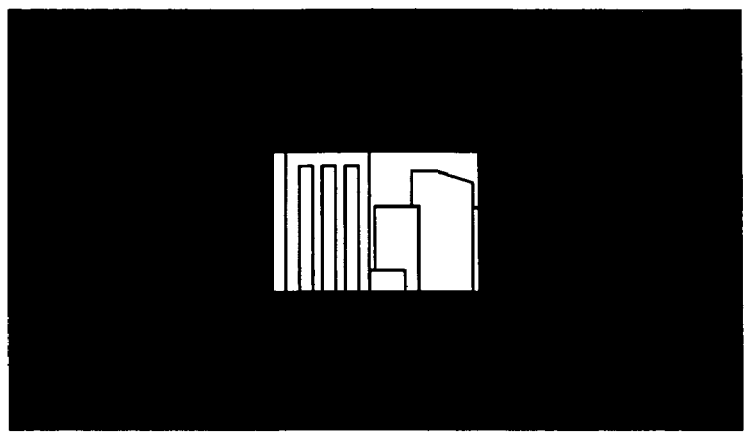
FIG. 36 is a diagram showing an exemplary screen during when a slide show content is created.

As a result, as shown in FIG. 36, the TV 2 displays only the effect-applied still images. The slide show content creation section 33 receives only the playback result of the still image playback section 43, i.e., a series of still images. If this is the case, the BGM played back by the BGM playback section 44 is also output from the speaker of the TV 2 or others.

The processes of step S93 and onward are repeated until the slide show content is completely created. The screen displaying only the playback result as shown in FIG. 36 is continuously displayed until creation of the slide show content is completed. As such, during when a slide show content is created, the screen displays only information in need so that the user can check the details of a slide show content as they are during the creation process thereof.

In step S95, the slide show content creation section 33 encodes the series of still images coming from the playback section 34 by MPEG2, for example, so that a slide show content is created. In step S96, the slide show content creation section 33 stores the resulting created slide show content into the HDD 20.

In step S97, the slide show content creation section 33 determines whether creation of the slide show content is completed or not, i.e., whether the playback result by the playback section 34 is entirely captured through MPEG2 encoding. When the determination is made as not yet, the procedure returns to step S93 for the further processes.

On the other hand, in step S97, when the slide show content creation section 33 determines that the slide show content is completely created, the procedure returns to step S39 of FIG. 11 for the further processes. As a result, the category of "video" on the menu screen is added with an icon for the slide show content.

By going through such a series of processes, the user can create a playlist easily and swiftly. What is more, it is possible to store the one same as the playback result of the playlist as a video content, i.e., slide show content, easily and swiftly.

By referring to the flowchart of FIG. 37, described next is a playlist playback process to be executed by the information processing device 1.

The playlist playback process is to be executed when a user's command is issued from the menu screen to play back the playlist created by the above series of processes. As described above by referring to FIG. 26, the created playlist is displayed on the menu display as a content for the category of "photo" to be available for the user to issue a command for playback.

Figure 37:
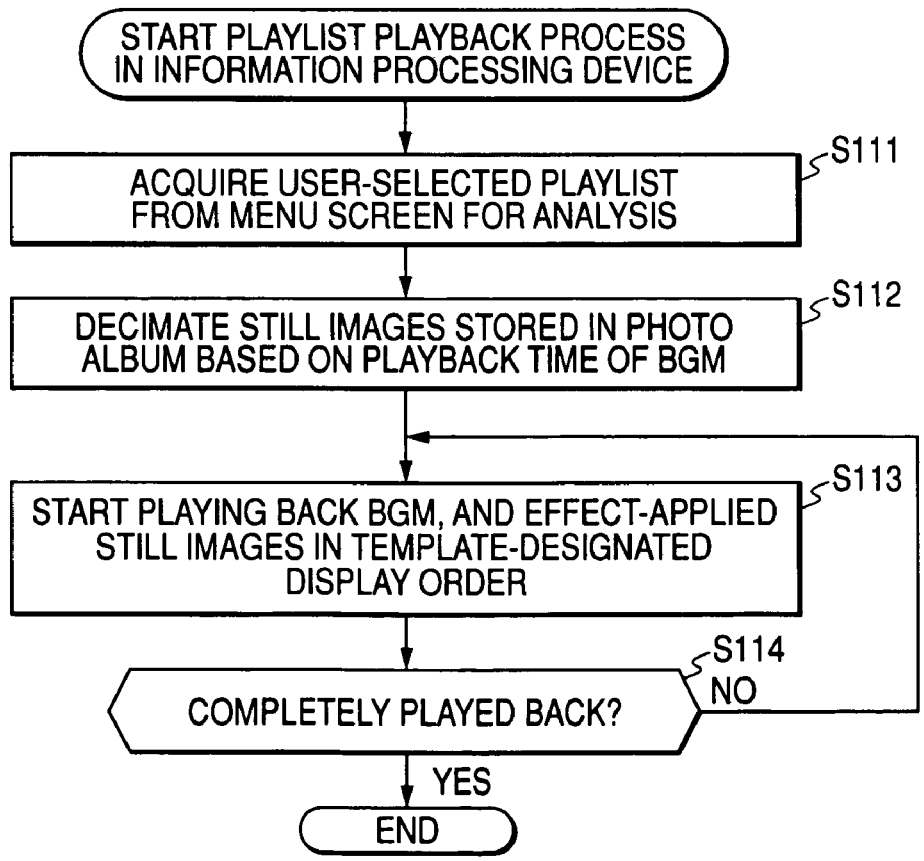
FIG. 37 is a flowchart illustrating a playlist playback process in the information processing device.

The processes of FIG. 37 are similar to those described by referring to FIG. 33. That is, when a specific playlist is selected in the menu screen, and when a command is issued for playback thereof, in step S111, the playlist analysis section 41 acquires the playlist coming from the content management section 31 for analysis. The playlist analysis section 41 forwards the identification information about the BGM to the BGM playback section 44, and the template to the extraction section 42 and the still image playback section 43.

In step S112, the extraction section 42 decimates the still images in the photo album coming from the content management section 31 based on the playback time of the BGM. The resulting group of still images is forwarded to the still image playback section 43.

In step S113, the BGM playback section 44 starts playing back the BGM. The still image playback section 43 goes through effect application to the still images coming from the extraction section 42 for playback. In this manner, the TV 2 displays such a screen as shown in FIG. 36.

In step S114, the still image playback section 43 determines whether the still images are completely played back. If the determination is made as No, the procedure returns to step S113 to repeat playback of the still images. When the still image playback section 43 determines in step S114 that the still images are completely played back, the procedure is ended.

Figure 38:
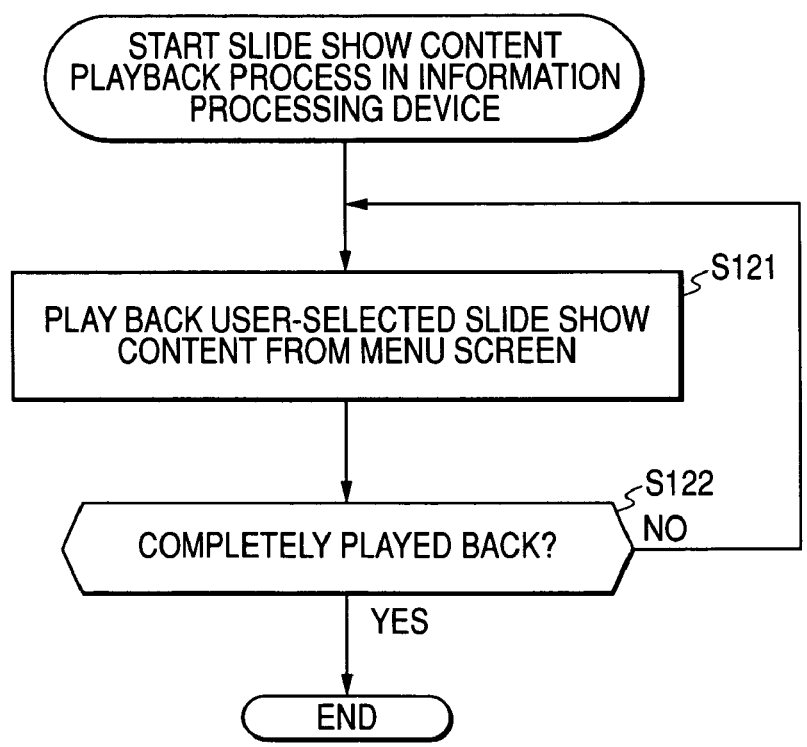
FIG. 38 is a flowchart illustrating a slide show content playback process in the information processing device.

By referring to the flowchart of FIG. 38, described next is a slide show content playback process to be executed by the information processing device 1.

The slide show content playback process is to be executed when a user's command is issued from the menu screen to play back the slide show content as a result of the series of processes as described above. As described above by referring to FIG. 31, the resulting created slide show content is displayed on the menu screen as a content for the category of "video" to be available for the user to issue a command for playback or writing it onto the optical disk 25.

The slide show content is the one compressed by MPEG2 similarly to video contents for the television programs. Therefore, the recording/playback section 17 of FIG. 4 is in charge of playing back the slide show content, or the slide show content may be played back by software.

In step S121, the recording/playback section 17 reads from the HDD 20 the slide show content selected by the user from the menu screen for playback. The image data and the audio data (BGM data) derived by the recording/playback section 17 are both forwarded from the output section 19 to the TV 2.

In step S122, the recording/playback section 17 determines whether the slide show content is completely played back. When the determination is made as No, the procedure returns to step S121 so that the slide show content is repeatedly played back. When the recording/playback section 17 determines in step S122 that the slide show content is completely played back, the procedure is ended.

This thus allows the user to view and listen a slide show content in much the same way as any other video contents such as television programs.

In the above, the BGMs are exemplified as being prepared in the information processing device 1 in advance. Alternatively, music tunes captured by users into the information processing device 1 from music CDs or others are to be available for BGM selection.

With this being the case, when a music tune is captured into the information processing device 1 from a music CD, attribute information including music tempo and genre of the captured music tune is provided to the information processing device 1. The attribute information comes from the music CD or a predetermined server connected over a network. In accordance with the atmosphere of the music determined using the attribute information, a correspondence is established with a template for the effect matching to the captured music tune. Such a correspondence is established based on the attribute information about the music and the information in the "atmosphere" of the template of FIG. 3.

This accordingly includes the music tune captured by the user into the information processing device 1 as a selection option for a BGM. What is more, because the captured music tune is automatically correlated to the template, the user can select the template only by selecting the BGM.

Herein, the template to be correlated to the music tune may not be previously provided in the information processing device 1, and alternatively, may be downloaded from a server connected over a network, or captured through the optical disk 25 or others.

Further, in the above, the one-to-one correspondence is established between the BGM and the effect (template), and thus the still images are applied with the effect corresponding to the selected BGM for playback. Alternatively, a single BGM may be correlated to a plurality of effects matching in atmosphere of the BGM. With this being the case, after selecting a BGM, the user can select any effect to suit their preferences.

The above-described series of processes are to be executed both by hardware and software.

In a case where the processes are to be executed by software, computers including the software program installed in any specific hardware will take charge thereof. Alternatively, the software program may be installed over a network or a recording medium into PCs capable of various features, e.g., general-purpose computers, with various programs installed thereinto.

As shown in FIG. 4, the recording medium is exemplified by the program-storing memory card 23 or optical disk 25, which is distributed to provide the user with the program separately from the device. This is not the only option, and the recording medium may be the program-storing ROM 12, a hard disk included in the HDD 20, and others, those of which are incorporated in the device for distribution to the user.

In this specification, the steps are to be executed in time series following the described order. This is surely not restrictive, and the steps are to be executed simultaneously or separately.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing device, comprising:
  management means for managing a plurality of still images with a correlation between a BGM (Back Ground Music) at playback time and details of an effect applied at playback time to each of the still images; and
  playlist creation means for creating a playlist that defines a procedure of sequentially playing back the still images selected by a user with details of an effect correlated by the management means to a BGM selected by the user,
  the user selecting a group of still images, and the still images that are played back being selected from the group according to a playback time of the BGM, the group of still images including one or more image(s) designated automatically by the information processing device as image of higher priority, wherein the image(s) designated as image of higher priority must be selected for playback, the details of the effect applied at playback time including a combination of sub effects, and the combination of sub effects being predetermined solely on the basis of the BGM selected by the user such that sub effects included in the combination need not be selected from among a group of sub effects after BGM selection.

2. The information processing device according to claim 1, wherein
the playlist creation means creates the playlist that defines the procedure of playing back the still images stored in a folder selected by the user.

3. The information processing device according to claim 1, further comprising
playback means for playing back, with the BGM selected by the user, the still images in accordance with the procedure defined by the playlist created by the playlist creation means.

4. The information processing device according to claim 3, further comprising
extraction means for decimating the still images selected by the user to derive a group of still images for playback when a first playback time to be taken to play back all of the still images selected by the user is longer than a second playback time to be taken to play back the BGM selected by the user, wherein
the playback means plays back the group of still images derived by the extraction means.

5. The information processing device according to claim 4, wherein
the extraction means derives the group of still images for playback to substantially equalize the first and second playback times.

6. The information processing device according to claim 3, further comprising
dynamic content creation means for storing a playback result derived by the playback means as a dynamic content.

7. The information processing device according to claim 3, wherein
when a playback time to be taken to play back all of the still images selected by the user is longer than a playback time to be taken to play back the BGM selected by the user,
the playback means repeatedly plays back the BGM until all of the still images selected by the user are played back in accordance with the procedure defined by the playlist.

8. The information processing device according to claim 1, further comprising
menu display means for displaying a menu that includes a plurality of category icons each representing a category in a predetermined direction, and in a direction orthogonal to the predetermined direction, a plurality of content icons each corresponding to a content belonging to each of the categories.

9. The information processing device according to claim 8, wherein
the menu display means displays, in the menu, the playlist created by the playlist creation means as a content belonging to a still image category.

10. The information processing device according to claim 8, further comprising:
playback means for playing back the still images, with the BGM selected by the user, in accordance with the procedure defined by the playlist created by the playlist creation means; and
dynamic content creation means for storing a playback result derived by the playback means as a dynamic content, wherein
the menu display means displays, in the menu, the dynamic content created by the dynamic content creation means as a content belonging to a moving image category.

11. The information processing device according to claim 10, further comprising
output control means for exercising control over the dynamic content created by the dynamic content creation means to be recorded on a recording medium or output to other equipment.

12. The information processing device according to claim 1, wherein
when the BGM selected by the user is correlated plurally to the details of the effect,
the playback means sequentially plays back the still images selected by the user with any one of the effects selected by the user among the effects correlated to the BGM selected by the user.

13. The information processing device according to claim 1, wherein
the details of the effect are set to match with an atmosphere of the BGM in accordance with a tempo or a music genre.

14. The information processing device according to claim 1, wherein
the BGM is previously stored.

15. The information processing device according to claim 1, wherein
the BGM is stored by the user.

16. The information processing device according to claim 15, wherein
attribute information including the tempo and music genre of the BGM stored by the user is acquired from a predetermined server through a music CD (Compact Disk) or over a network, and the attribute information is used as a basis to establish a correlation between the an effect and the BGM.

17. An information processing method for managing a plurality of still images with a correlation between a BGM (Back Ground Music) at playback time and details of an effect applied at playback time to each of the still images, the method comprising
creating a playlist that defines a procedure of sequentially playing back the still images selected by a user with details of an effect correlated to a BGM selected by the user,
the user selecting a group of still images, and the still images that are played back being selected from the group according to a playback time of the BGM, the group of still images including one or more image(s) designated automatically by a device as image of higher priority, wherein the image(s) designated as image of higher priority must be selected for playback,
the details of the effect applied at playback time including a combination of sub effects, and the combination of sub effects being predetermined solely on the basis of the BGM selected by the user such that sub effects included in the combination need not be selected from among a group of sub effects after BGM selection.

18. A recording medium recorded with a program operable to instruct a computer to execute an information processing method for managing a plurality of still images with a correlation between a BGM (Back Ground Music) at playback time and details of an effect applied at playback time to each of the still images, the method comprising creating a playlist that defines a procedure of sequentially playing back the still images selected by a user with details of an effect correlated to a BGM selected by the user, the user selecting a group of still images, and the still images that are played back being selected from the group according to a playback time of the BGM, the group of still images including one or more image(s) designated automatically by the computer as image of higher priority, wherein the image(s) designated as image of higher priority must be selected for playback, the details of the effect applied at playback time including a combination of sub effects, and the combination of sub effects being predetermined solely on the basis of the BGM selected by the user such that sub effects included in the combination need not be selected from among a group of sub effects after BGM selection.

19. An information processing device, comprising:

a management section managing a plurality of still images with a correlation between a BGM (Back Ground Music) at playback time and details of an effect applied at playback time to each of the still images; and a playlist creation section creating a playlist that defines a procedure of sequentially playing back the still images selected by a user with details of an effect correlated by the management section to a BGM selected by the user, the user selecting a group of still images, and the still images that are played back being selected from the group according to a playback time of the BGM, the group of still images including one or more image(s) designated automatically by the information processing device as image of higher priority, wherein the image(s) designated as image of higher priority must be selected for playback, the details of the effect applied at playback time including a combination of sub effects, and the combination of sub effects being predetermined solely on the basis of the BGM selected by the user such that sub effects included in the combination need not be selected from among a group of sub effects after BGM selection.

* * * * *